(12) United States Patent
Jones et al.

(10) Patent No.: US 7,743,061 B2
(45) Date of Patent: Jun. 22, 2010

(54) DOCUMENT SEARCH METHOD WITH INTERACTIVELY EMPLOYED DISTANCE GRAPHICS DISPLAY

(75) Inventors: Dumont M. Jones, Columbus, OH (US);
Vadim M. Koganov, Powell, OH (US)

(73) Assignee: Proximate Technologies, LLC, Columbus, OH (US)

( * ) Notice: Subject to any disclaimer, the term of this patent is extended or adjusted under 35 U.S.C. 154(b) by 1633 days.

(21) Appl. No.: 10/706,352

(22) Filed: Nov. 12, 2003

(65) Prior Publication Data

US 2004/0098389 A1    May 20, 2004

Related U.S. Application Data

(60) Provisional application No. 60/425,854, filed on Nov. 12, 2002.

(51) Int. Cl.
*G06F 17/30* (2006.01)

(52) U.S. Cl. .................................. 707/741; 707/959

(58) Field of Classification Search .................. None
See application file for complete search history.

(56) References Cited

U.S. PATENT DOCUMENTS

| | | | |
|---|---|---|---|
| 5,278,980 A | 1/1994 | Pedersen et al. | 707/4 |
| 5,297,039 A | 3/1994 | Kanaegami et al. | 707/5 |
| 5,442,778 A | 8/1995 | Pedersen et al. | 707/5 |
| 5,553,226 A | 9/1996 | Kiuchi et al. | 715/835 |
| 5,600,835 A | 2/1997 | Garland et al. | 707/5 |
| 5,642,502 A | 6/1997 | Driscoll | 707/5 |
| 5,659,766 A | 8/1997 | Saund et al. | 704/9 |
| 5,687,364 A | 11/1997 | Saund et al. | 704/5 |
| 5,706,365 A | 1/1998 | Rangarajan et al. | 707/102 |
| 5,748,953 A | 5/1998 | Mizutani et al. | 707/6 |
| 5,771,378 A | 6/1998 | Holt et al. | 707/5 |
| 5,787,420 A | 7/1998 | Turkey et al. | 707/5 |
| 5,893,092 A | 4/1999 | Driscoll | 707/5 |
| 5,978,797 A | 11/1999 | Yianilos | 707/3 |
| 6,047,277 A | 1/2000 | Parry et al. | 706/20 |
| 6,012,053 A | 2/2000 | Pant et al. | 707/3 |
| 6,131,091 A | 10/2000 | Light | 707/5 |
| 6,154,213 A * | 11/2000 | Rennison et al. | 715/854 |
| 6,169,969 B1 | 1/2001 | Cohen | 704/10 |

(Continued)

OTHER PUBLICATIONS

Geoffrey M. Downs and Peter Willett,*Similarity Searching in Databases of Chemical Structures*, Reviews in Computational Chemistry, vol. 7, VCH Publishers, Inc., New York, 1996.

(Continued)

*Primary Examiner*—John R. Cottingham
*Assistant Examiner*—Kimberly Lovel
(74) *Attorney, Agent, or Firm*—Mueller Smith & Okuley, LLC

(57) ABSTRACT

Method for carrying out the text content search of a document database utilizing multi-node nets. The nodes of these nets are associated with interactions and are loaded with initially selected criteria, whereupon a potential or distance function calculation is carried out with respect to each document of the database and those criteria containing nodes. The created nets are displayed with document symbols geometrically located with respect to the nodes and interaction lines in correspondence with the computed potentials to provide for an interactive visual evaluation of the search by the user. Such evaluations then may be employed to refine node contained criteria toward useful rule-based nodes.

24 Claims, 17 Drawing Sheets

U.S. PATENT DOCUMENTS

| | | | |
|---|---|---|---|
| 6,260,051 B1 | 7/2001 | Katamyama et al. | 715/536 |
| 6,360,227 B1 * | 3/2002 | Aggarwal et al. | 707/102 |
| 6,397,205 B1 | 5/2002 | Juola | 707/2 |
| 6,445,822 B1 | 9/2002 | Crill et al. | 382/218 |
| 6,480,837 B1 | 11/2002 | Dutta | 707/3 |
| 6,499,026 B1 | 12/2002 | Rivette et al. | 707/2 |
| 6,505,197 B1 | 1/2003 | Sundaresan et al. | 707/6 |
| 6,519,580 B1 | 2/2003 | Johnson et al. | 706/47 |
| 6,522,782 B2 | 2/2003 | Pass et al. | 382/218 |
| 6,526,440 B1 | 2/2003 | Bjarat | 709/219 |
| 6,535,875 B2 | 3/2003 | Takahashi et al. | 707/3 |
| 6,542,889 B1 | 4/2003 | Aggarwal et al. | 707/5 |
| 6,553,382 B2 | 4/2003 | Hatori | 707/102 |
| 6,611,825 B1 | 8/2003 | Billheimer et al. | 706/45 |
| 6,621,930 B1 | 9/2003 | Smadja | 382/224 |
| 6,625,606 B1 | 9/2003 | Kondo | 707/100 |
| 6,631,373 B1 | 10/2003 | Otani et al. | 707/5 |
| 6,633,868 B1 | 10/2003 | Min et al. | 707/3 |
| 6,654,739 B1 | 11/2003 | Apte et al. | 707/5 |
| 6,654,743 B1 | 11/2003 | Hogg et al. | 707/7 |
| 6,665,661 B1 | 12/2003 | Crow et al. | 707/3 |
| 6,668,256 B1 | 12/2003 | Lynch | 707/104.1 |
| 6,778,995 B1 * | 8/2004 | Gallivan | 707/102 |
| 6,888,548 B1 * | 5/2005 | Gallivan | 345/440 |
| 7,028,026 B1 * | 4/2006 | Yang et al. | 707/3 |
| 7,085,755 B2 * | 8/2006 | Bluhm et al. | 707/3 |
| 2003/0135513 A1 * | 7/2003 | Quinn et al. | 707/102 |
| 2004/0078366 A1 * | 4/2004 | Crooks et al. | 707/3 |
| 2005/0086238 A1 * | 4/2005 | Nevin, III | 707/100 |

OTHER PUBLICATIONS

Wray Buntine, *Graphical Models for Discovering Knowledge*, Thinkbank, Inc.

Chun-Nan Hsu and Craig . Knoblock, *Using Inductive Learning to Generate Rules for Semantic Query Optimization*, University of Southern California.

\* cited by examiner

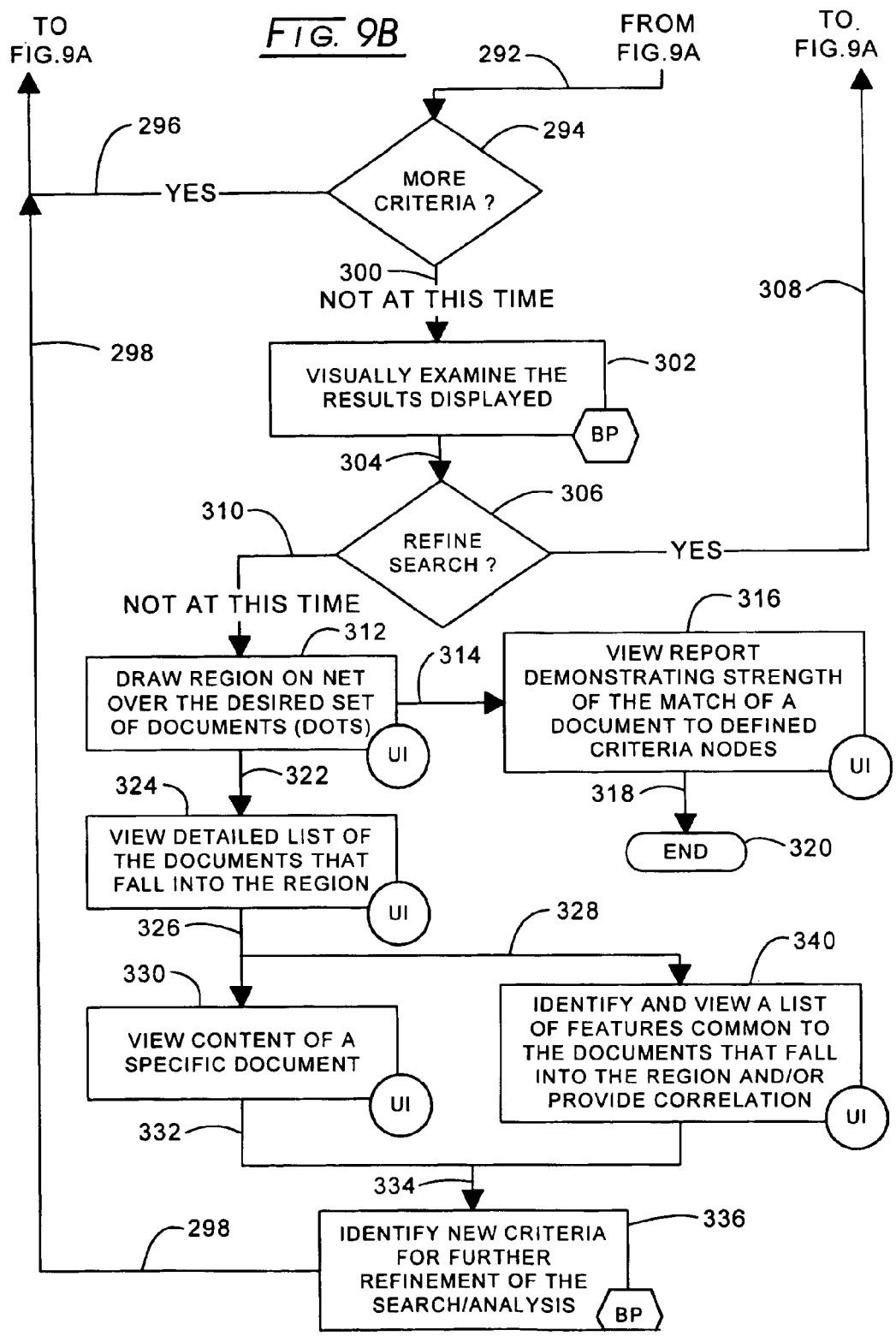

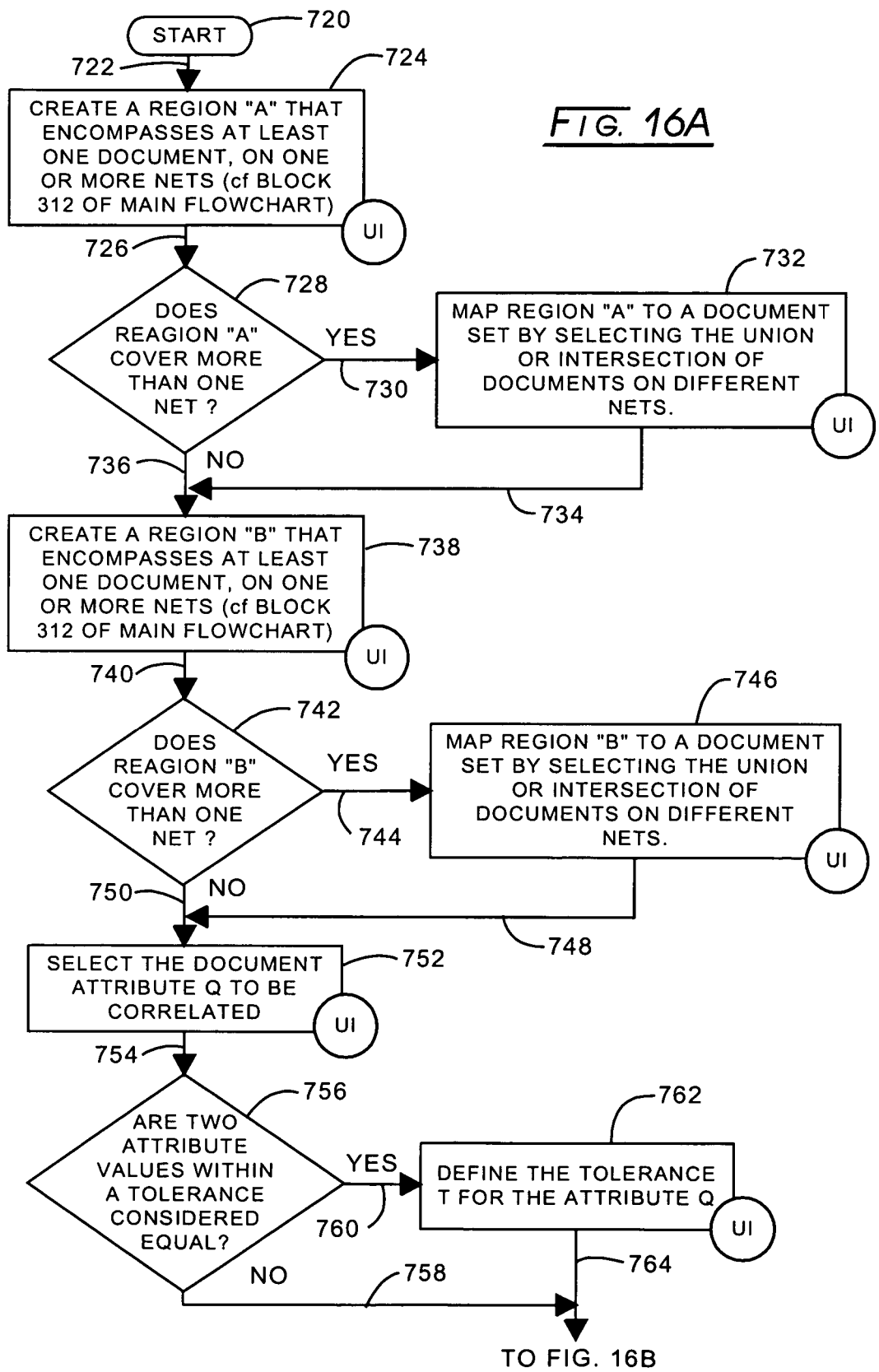

DOCUMENT SEARCH METHOD WITH INTERACTIVELY EMPLOYED DISTANCE GRAPHICS DISPLAY

CROSS-REFERENCE TO RELATED APPLICATIONS

This application relies upon Provisional Application No. 60/425,854 filed Nov. 12, 2002 entitled "Method for visual content Analysis and Searching"

STATEMENT REGARDING FEDERALLY SPONSORED RESEARCH

Not applicable.

BACKGROUND OF THE INVENTION

The storage of textual material in memory retained databases has expanded and continues to expand to an extent wherein accessing the information content of a given data base may represent an overwhelming complexity. Historically, data base management systems have attempted to organize information into some manageable order, looking to hierarchical, networked and relational structures which hopefully are searchable with respect to some attribute or combination of attributes. Notwithstanding such efforts, as the size and complexity of the many data bases has grown, conventional search engines tend to locate either too much or too little information. For instance, employing key words at the commencement of a search may result in failure for a number of reasons. The documents representing a textual data base typically are the product of diverse individuals with their own selections and patterns, for example, as may be manifested in resume related data bases. Terms employed by practitioners in the technical world often change over time and the vocabularies involved in those endeavors will be added to. As a consequence, the text discussion concerning a technical subject in an early document may only marginally resemble the text discussion of that same subject in a later document. Groups or individuals endeavoring in a specific technical endeavor who are unaware of each other may evolve their own unique different descriptors for the same technical element. Where a search calls for a combination of attributes not present in any one document of the data base, it may fail inasmuch as conventional searching procedures generally are incapable of finding information which is "close".

Conjuring a searching rule at the outset of a search, unless profoundly simplistic, typically will be unrealistic. In this regard a workable rule must be formulated based on the content of the database draft.

In general, the more significant problem associated with obtaining desired information from a modern textual data base is not so much concerned with the search engine at hand. The problem resides in formulating the question to be asserted to the search engine to find reasonably relevant result candidates. Once those candidates are found, the searcher must be able to quickly and efficiently evaluate the various document candidates evolved in the search without undue reading efforts. Typical search systems are so question-dependant that many documents will be excluded even though they may contain at least some information sought by the searcher.

BRIEF SUMMARY OF THE INVENTION

The present invention is directed to a method for evaluating or searching the text content of a document database utilizing a potential (field) or distance function approach in combination with a graphics display of one or more multi-node nets. This geometric display achieves a human vision-based user interaction permitting the generation of refined net nodes essentially without recourse to requiring the user to read an excessive amount of textual material.

Among the search refinements made available with the method is the efficient removal of common features of text otherwise present as noise in the search system. Additionally, the method permits the efficient isolation of common desired features of text without undue user labor. Multiple displayed nets may be applied to a correlation procedure by the user wherein document symbols within the nets having essentially the same attributes and attribute values are visibly associated between and among the nets. Such correlation between the document symbols may be displayed, for example, as connecting lines relating the relative strengths of the document attributes within each of the nets.

Another feature and object of the invention is the provision of a method for evaluating the text content of the document database with respect to a document population, comprising the steps of:

(a) providing a computer system having a user interface with a display;
(b) gathering documents from the database into the system;
(c) normalizing the gathered documents;
(d) fingerprinting the gathered documents;
(e) determining a text criteria with respect to the document population;
(f) forming a net comprising at least two nodes associated by at least one interaction and displayable at the display as two spaced-apart nodes connected by an interaction;
(g) loading the text criteria into one of the nodes;
(h) for each document of the database, calculating its geometric relative distance from a node to derive one or more node attractors;
(i) displaying the net at the display in combination with one or more document symbols representing a document or documents located in correspondence with the calculated relative distance;
(j) visually examining the display of the net and document symbols; and
(k) determining from the document symbol locations at the display those documents, if any, more likely to correspond with the text criteria.

Another feature and object of the invention is to provide a method for evaluating the text content of a document database with respect to a population of documents comprising of:

(a) providing a computer system having a user interface with a display;
(b) forming one or more nets each comprising at least two nodes associated by at least one interaction, one or more of the nodes representing an evaluation criteria and the one or more nets being viewable at the display;
(c) treating the documents to have an attribute value and calculating for each document a geometric relative distance with respect to a node criteria and displaying corresponding document symbols at the display;
(d) delimiting at the display a first region of the document symbols;
(e) delimiting at the display a second region of the document symbols;
(f) selecting a document attribute to be correlated and the criteria for establishing attribute value match;

(g) determining the presence of one or more document attribute value match pairs as correlations between the first and second regions; and (h) displaying the correlations at the display.

Another object and feature of the invention is to provide a method for searching the text content of a document database with respect to a population of documents, comprising the steps of:

(a) providing a computer system having a user interface with a display;

(b) identifying the population of documents to be searched;

(c) normalizing the documents of the identified population with the steps comprising;

(c1) selecting character sequences that will separate words, (c2) determining to either retain or eliminate punctuation characters, (c3) setting regular expressions that will characterize numbers, (c4) setting case behavior, (c5) setting an offset and factor for numeric classes, (c6) converting a document of the identified population to a character sequence, (c7) accessing the words, or punctuation characters, W of the character sequences, (c8) for each accessed W which is a number, converting such number into a normalized sequence of number words WN suitable for fingerprinting, (c9) marking the position and length of each W or normalized word number WN, (c10) for each W completing the normalization by reiterating steps (c8) and (c9);

(d) fingerprinting the normalized documents;

(e) forming one or more nets, each comprising at least two nodes, one or more of the nodes representing an evaluation criteria, the one or more nets exhibiting two or more spaced-apart nodes connected by one or more interactions;

(f) for each normalized document, calculating its geometric relative distance from a node;

(g) displaying the one or more nets at the display in combination with one or more document symbols representing a document located in correspondence with the calculated relative distance; and determining from the document symbol locations at the display, if any, those documents which are more likely to correspond with the evaluation criteria.

Other objects of the invention will, in part, be obvious and will, in part, appear hereinafter.

The invention, accordingly, comprises the method possessing the steps which are exemplified in the following detailed description.

For a fuller understanding of the nature and objects of the invention, reference should be had to the following detailed description taken in connection with the accompanying drawings.

BRIEF DESCRIPTION OF THE DRAWINGS

FIGS. 9A and 9B combine as labeled thereon to provide a flowchart illustrating the overall method of the invention;

FIGS. 16A and 16B combine as labeled thereon to provide a flowchart showing the method of document correlation according to the invention;

DETAILED DESCRIPTION OF THE INVENTION

Figure 1:
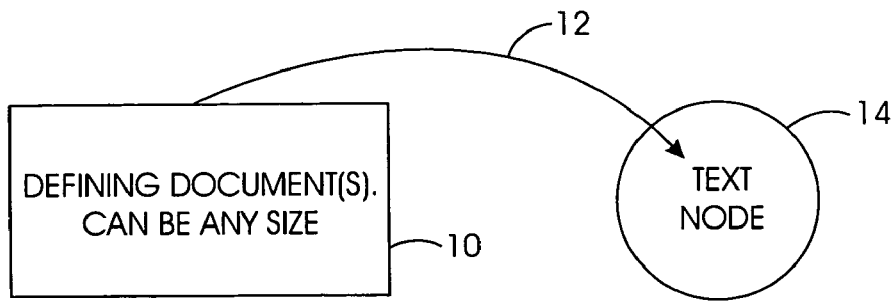
FIG. 1 is a schematic diagram illustrating the formation of a text node employed with the method of the invention.

The document evaluation method of the present invention is one which evolves what may be analyzed as a potential which attracts textual objects containing attributes of interest. This combination then interactively invokes the cerebral input of the user by the visualization of networks comprised of nodes, associated interactions and distance related document symbols at a computer system display. Because of the importance of this visualization aspect of the method, nets formed with circularly shaped nodes and interactions defined as lines are described initially as they may be seen at the computer system display. The discourse then turns to flow charts describing system inputs with respect to the business or entity seeking the evaluation of a document population, the user interaction as part of the method and the computer system processing aspect of the method.

The term "document," "record", or "object" as used herein is intended to mean any sequence of bytes with an associated interpretation in terms of data types. This includes, but is not limited to, any combination of the following: one or more sequences of text characters, one or more sequences of binary (non-text) data, one or more numeric values, one or more attributes, one or more (other) documents.

The terms "potential", "field", "force", or "attractor" as used herein are intended to encompass any system element that applies a force to a document. The force in turn is used to calculate geometric distance from net nodes to documents. A "force" has the conventional interpretation that an object subjected to a force will obey a classical equation of motion (i.e. F=ma).

The term "attribute", "feature" as used herein are intended to mean an optional text string (the attribute name), and a value (any data type). "External" attributes represent a property of an entire document. "Internal" attributes represent a property of one part of a document, typically a textual sequence within a document.

The term "attribute value" is the value assigned to a document attribute.

The terms "text" or "text content" as used herein are intended to mean:
  (1) conventional text (data interpretable as a sequence of human-readable symbols including numbers).
  (2) data convertible to such a sequence, (e.g. binary data rendered in hexidecimal format),
  (3) text as defined in (1-2) decorated with external attributes, each of which may contain named numeric data and/or one or more named sequences (1-2).

Initially, the method is readily subjected to a somewhat formal analysis looking to a set of objects (documents) stored in a database system.

Formally each of these objects may be represented, in the well-known bra-ket notation, as follows:

$$O=(|D><D|)(|a>qa(D)<a|) \quad (1)$$

where $|a>$ denotes the attribute "a," $|D>$ represents the database object D, $q(a,D)$ denotes the value of $|a>$ for object $|D>$, and the sum over the attributes $|a>$ is implied. Any pair of kets $|x>$ and bras $<x|$ obey the orthonormality relations:

$$<a|a'>=1(a=a'),=0(a!=a'); <D|D'>=1(D=D').=0$$
$$(D!=D') \quad (2)$$

The orthonormality of two attributes $|a>$ abd $|a'>$ is maintained, even if these attributes are statistically correlated when the database is considered as a whole. The attribute values qa must be calculated in order to proceed with any particular analysis. It will prove helpful to distinguish between "internal" object attributes that are typically calculated, and "external" attributes that are typically assigned. (An example of an external attribute for an object might be its date of creation or object ID.) With no loss of generality one may write:

$$O=(|D><D|)(|I>qi(D)<i|+|e>qe(D)<e|) \quad (3)$$

where (2) still holds, the sums over internal attributes $|i>$ and external attributes $|e>$ are implied, and the following requirement is also imposed:

$$<i|e>=0 \quad (4)$$

that is any attribute must be internal or external. Typically the values qi indicate the presence of an internal attribute (qi=1), or an internal attribute count (qi=(1, 2, 3 . . . )). However the values qi and qe are unrestricted. By convention, if a value qa, qe, or qi is identically 0 in (1) or (3), the corresponding attribute is not included in the sums on the right-hand sides of those equations.

To allow for the possibility of analysis in a time-changing potential, a mass is always assigned as an external attribute:

$$<m|O|m>=qm!=0 \quad (5)$$

$$<m|e>qe<e|m>!=0 \quad (6)$$

$$<m|I>qi<i|m>=0 \quad (7)$$

One may discriminate frequency-dependent document responses based on a differing document masses, although typically qm=1.

Potentials under the methodology as noted above may be considered as external potentials, which are applied to the documents in a system, which utilizes a visualization mechanism manifested as pictures of nets to ascertain and iteratively improve the response of objects to those potentials.

Generally, an applied potential is represented as $$V=|D>|dn>|n>|i>vi(r,dn,D,n)<i|<n|<dn|<D|+$$
$$|D>|dn>|n>|e>ve(r,dn,D,n)<e|<n|<dn|<D|+$$
$$|n>vi_o(r,n)<n| \quad (8)$$

in which the definitions of $|i>$ and $|e>$ carry over from equations (3) and (4). The ket $|n>$ represents a node, which has a spatial position, and constitutes a center-of-applied-potential. The node will appear below as a visual node in the net taxonomies used to spatially separate documents. r is a spatial vector for the potentials vi and ve. $|dn>$ represents any object used to construct a portion of potential V on node n, while $|D>$ represents a database object. Finally $vi_o(r,n)$ is an optional function that allows a "null" node without an attribute-related potential to nonetheless attract objects. In practice $vi_o(r,n)$ is a weakly-attracting potential-it serves only to assure that an object not otherwise attracted to any node appears visually in the neighborhood of a node.

The presence of $|dn>$ and $|D>$ allows specialized actions to be taken on individual database objects $|D>$ or potential objects $|dn>$.

Generally, the following simpler form suffices:

$$V=(D>|dn>F(Q(D),Q(dn)<D|<dn|)(|n>|i>vi(r,dn,n)$$
$$<i|<n|)+(|D>|dn>fe(Q(D),Q(dn)<D|<dn|)$$
$$(|n>|e>ve(r,dn,n)<e|<n|)+|n>vi_o(r,n)<n| \quad (9)$$

where Q(D) denotes an aggregate object property for $|D>$, and Q(dn) denotes the same property for $|d>$. F and fe are binary functions that are formally unrestricted.

Finally, the external attribute potentials typically do not require document-specific normalization, leaving the following working potential operator:

$$V=(D>|dn>F(Q(D),Q(dn)<D|<dn|)(|n>|i>vi(r,dn,n)$$
$$<i|<n|)+|n>|e>ve(r,n)<e|<n|)+|n>vi_o(r,n)<n| \quad (10)$$

Expression (10) provides a raw potential based on a set of object attributes. This potential will interact with objects that have any of the attributes $|i>$ or $|e>$ found in (10). As discussed in the next section, it is possible for textual and numeric data to choose a representation for which related objects have similar responses to the potential V and interaction. This, combined with the visualization of the method, provide the basis for iterative, data-driven searching and analysis.

The potential V may be tailored to more specifically interact with particular kinds of data. For example, it may be undesirable to interact with all of the attributes within the documents $|dn>$ that make up a node $|n>$. In particular, suppose that a potential V is required that interacts strongly only with those internal attributes $|i>$ that are relatively unique in the overall database population. This serves to eliminate a priori, non-specific interactions. One can readily extract those internal attributes $|i>$ that occur most commonly in the database population, and remove these from the potential to create a more specific potential.

The interaction of an object O with V is defined as an inner product of O (3) and V (10), and represents an interaction proportional to a weighted attribute "overlap" between O and V. The portion of the interaction specific to O and |n> is given by:

$$<n|<dn|<a|D|OV(D,r,n)|D'>|dn>|n>p(dn) \quad (11)$$

where p(dn) is an factor that may be used to weight the contributions to the interaction provided by each node element |dn>. The potential (12) has a center of attraction at each node center. Applying the definition of O in (3) gives $$V(D,r,n)=\Sigma_{dn}p(dn)F(Q(D),Q(dn))\Sigma_i qi(D)vi\ (r;dn,n)+\Sigma_e qe(D)\ ve(r;n)+vi_o(r;n) \quad (12)$$

Expression (12) describes a generic interaction between a node n and an object D. Some special cases will illustrate how interactions behave in practice. Consider first a representation consisting purely of external numerical attributes, and these functions ge(D) and ve(r,n):

$$ge(D)=1/(eD-en+c) \quad (13)$$

$$ve(r;n)=(r-rn)^2 \quad (14)$$

$$vi_o(r;n)=e(r-rn)^2, \text{ where } e<<1. \quad (15)$$

Objects placed between two nodes with the potential (13)/(14) will take equilibrium positions proportional to their value of eD.

As a second example, consider a completely internal representation, and the following functions fi, qi, Q, and p, and vi $$F=[\max(1/a,1/b)] \quad (16)$$

$$qi(D)=1 \text{ for each internal attribute in D, 0 otherwise} \quad (17)$$

$$Q(D)=\text{number of attributes for object D} \quad (18)$$

$$Q(d)=\text{number of attributes for object d} \quad (19)$$

$$p(dn)=1 \text{ for maximum term in dn sum, 0 otherwise} \quad (20)$$

$$vi=(r-rn)^2 \text{ for each internal attribute in dn, 0 otherwise} \quad (21)$$

This produces an interaction in which the effective spring constant is proportional to the best overlap between a "node document" d and D (as measured by the fraction of overlapping attributes between d and D). Thus documents containing all or most of the attributes specified in any node document d will be most strongly attracted to the node.

To specify this example further, suppose that as attributes of a text document, we assign one internal attribute |i> for each unique word in the document. If a node potential contains one document, containing the three words "the word good," the node potential will contain three possible spring constants.

Value=1/3 for documents that contain one word in "the word good"

Value=2/3 for documents that contain two words in "the word good"

Value=3/3 for documents that contain all words in "the word good"

The potential (15)-(20) is identical to that used to analyze documents in accordance with the method at hand. However the method assigns more internal attributes to each document: along an attribute for each work in a document, the beginnings of each word, and phrases up to a threshold length are also used. Also, numbers are handled specially.

Generally potentials may be used to attract objects that possess one or more internal or external attributes. If set of database objects has "similarity of representation," i.e., if similar objects also have a large number of similar attributes, potentials can be constructed that will attract objects having a particular attribute, as well as similar objects having related attributes. This latter property holds for text documents, and makes the potential formalism a useful tool for the analysis of text document databases.

Circumstances arise when the simplifying process of "aggregrating" several nodes into a single spatial point is convenient. The aggregated nodes act together as a unit in their interactions with other net nodes. Visually, aggregation results in a simpler net with fewer nodes. Formally, an aggregated node combines the potentials (12) from several nodes as a weighted sum with a common spatial center "r". If any "internal" interactions between nodes within a single aggregate are present, they are typically removed upon aggregration. "Resolution" of nodes, which is the reverse of aggregation, restores the net to its pre-aggregation state. The processes of aggregation and resolution are analogous to the roll-up and aggregation operations commonly employed in database and data warehouse implementations.

The method at hand has been employed to locate desirable resumes from a large database of resumes. Accordingly, portions of the description to follow will refer to exemplary features of that resume search to clarify the description. The term "document" is used extensively herein. That term is intended to have a broad meaning, as described previously in this detailed description. A document is a container for any text fragment, large or small. It may, but need not, correspond to a physical file in a storage system. Often large documents are factored into document groups with, for example, one document per paragraph. Accordingly, the term will encompass text files, or files convertible to text, for example, word processing documents, PDF files, etc.

At the outset, following the identification of the population of documents to be searched or analyzed, the additional business aspect of determining "good" and/or "bad" documents is made as part of the initial formation of a net node. For example, in developing a node for evaluating a population of resumes, the resumes of successful hires may be examined and all or portions of their textual content loaded into a node. That node will be seen then to be iteratively refined to progress, in effect, towards a rule which may not have been discernable at the outset of the search.

Looking to FIG. 1, the noted business or entity elected defining document or textual information is identified as represented at block 10. That document or textual information is loaded as represented at arrow 12 into a text node represented as a circle 14. Node 14 will establish a potential that attracts similar text content.

Figure 2:
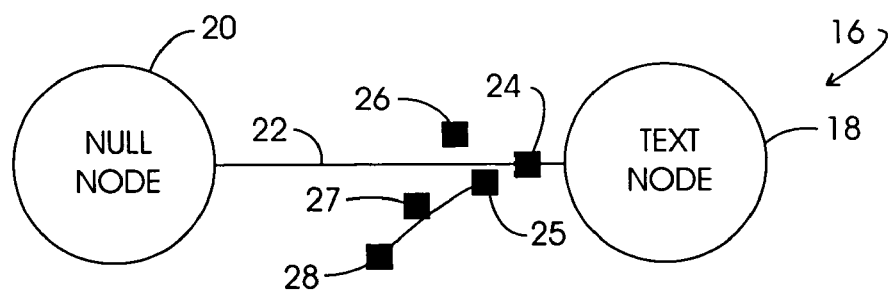
FIG. 2 is a schematic diagram showing a two node net comprised of a text node and a null node.

Looking to FIG. 2, a two node net is represented generally at 16. Net 16 comprises a positive text node described at 14 in FIG. 1 in combination with a null node represented at circle 20. Node 20 has no attractor information. In this regard the null node establishes no document potential (other than the "null" potential vio (r,n) (of equation 8), but is useful as an anchor in nets, i.e., a null node has no text or other properties. Nodes 18 and 20 are seen to be associated by an interaction which is displayed as a line 22 extending between them As part of the method, a geometric relative distance for each document within the document population will be calculated from the node potentials and displayed at the computer display as document symbols. In FIG. 2, document symbols are shown at 24-28. Symbols 24-28 as well as others are represented as squares. In the figure, those document symbols shown to be more closely associated with the interaction line 22 and node 18 will have the highest level of relevance. As the nodes are graphically located away from interaction line 22 and node 18 their relevance diminishes. Thus, the user will have a visual representation of the number of documents which are relevant and the extent of their relevancy without the need of reading the text itself. Nets as at 16 will consist of N nodes, where N>=2, and a set of M interactions, where each interaction connects two nodes. Each node must be connected to the other nodes in the net, perhaps by traversing several interactions in succession. Rather than solve the full equation of motion for a document over the full applied potential, the equation of motion is solved for each interaction and node pair independently. The position of each document (24-28) on each interaction line is plotted. Thus a document will be represented in general by M points, one for each interaction. In addition to plotting the position of a document along each interaction, the overall strength of that interaction is indicated by the distance of a document locus physical condition from the interaction line. The stronger the interaction, the closer to the interaction the point is plotted. This device allows an analyst to distinguish strong interactions visually. The "null" potential $vi_o(r, n)$ assures that an object with no attribute interactions is nonetheless attracted to each node. Note that node 18 is shown as a positive node in that it incorporates an attractor for documents which may be deemed to be "good" ones.

Figure 3:
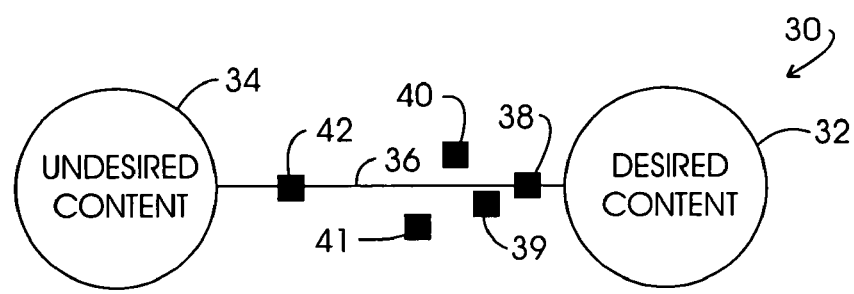
FIG. 3 is a schematic illustration of a two node net according to the invention showing a desired content node associated by an interaction line with an undesired content node.

Referring to FIG. 3, another two node net is represented generally at 30. As before, net 30 includes a node 32 representing desired document content and thus is shown as a positive node. Net 30 also incorporates a node 34, the attractor(s) of which represent undesired content. It therefore is designated as a negative node. Nodes 32 and 34 are seen visually associated with an interaction represented at line 36. By employing negative nodes as at 34, documents having no relevance to the search can be eliminated. In the figure, the document distances again are represented by document symbol blocks 38-42 which are identified by their relevance to node 32 and interaction 36. Note that document 42 is somewhat attracted to negative node 34, while document 41 may be of minor relevance to the search at hand.

Figure 4:
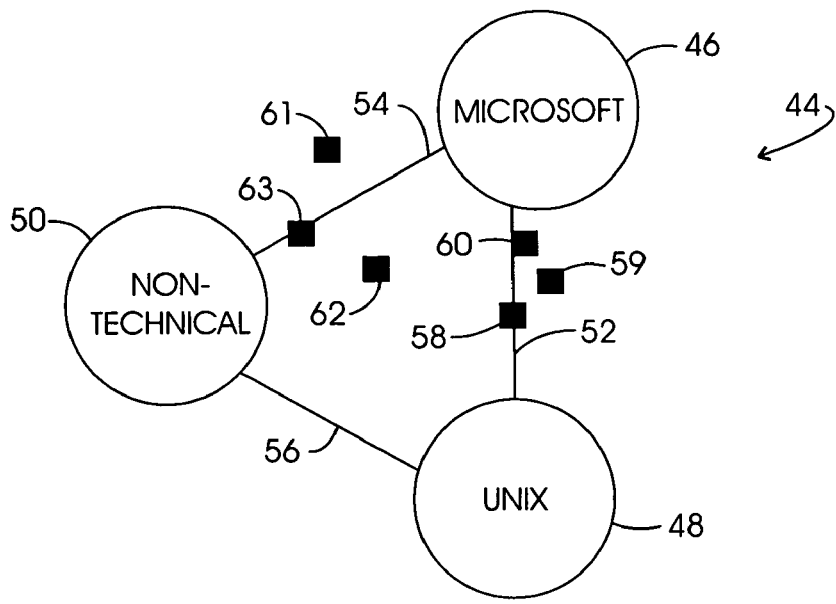
FIG. 4 is a schematic representation of a net according to the invention showing three nodes with mutually interacting.

Referring to FIG. 4, a three node net is illustrated in general at 44. Net 44 is exemplary of a search for "good" resumes wherein the candidates sought enjoy two types of experience, an experience in Microsoft technology as represented at positive node 46 as well as technical experience in conjunction with Unix systems as represented at positive node 48. On the other hand, the users desired to set aside candidates who had non-technical resumes. Thus, a negative or non-technical node 50 was developed. In accordance with the method at hand, an interaction extends between nodes 46 and 48 as represented at line 52. An interaction is associated between nodes 46 and 50 as represented at interaction line 54, and an interaction is associated between nodes 48 and 50 as represented by interaction line 56. Document symbols are represented in the figure in numerical correspondence with their relevance at 58-63. The position of documents on a net such as this, with more than two nodes, is resolved as follows. First, the node with the strongest force on a document is identified. The document will be placed on an interaction line attached to this node (There must be at least one such line.) Next, of these interactions, the interaction whose remaining node has the next strongest force is selected for document display. The placement along the selected interaction line then proceeds as in the case of a two-node net. The method allows for display of lesser interactions through the display of secondary document symbols on the same net, tied to the main document symbol with a line. For the search at hand, it was deemed to be desirable that candidates be elected showing some technical expertise relevant to both nodes 46 and 48. Accordingly, documents 58-60 were quite relevant, while documents, for example, at 63 represented non-technical marketing individuals.

Figure 5:
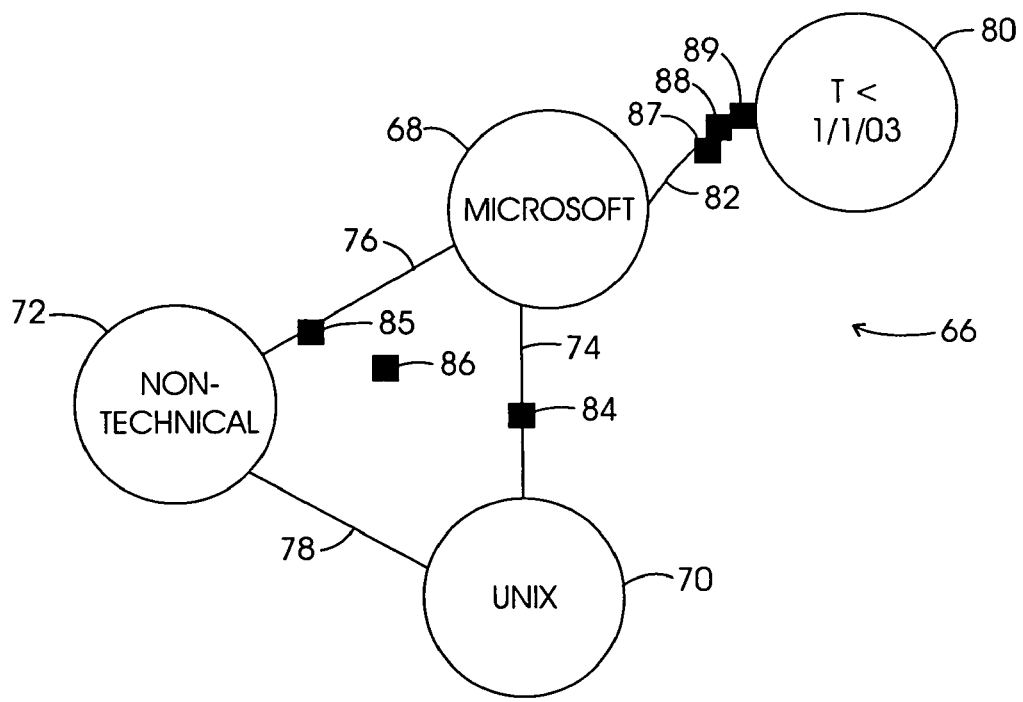
FIG. 5 is a schematic illustration of a net according to the invention showing the three node net of FIG. 4 in combination with a node that attracts numeric content (in this case, a date)

The two way technical skill search represented by the three node net 44 may be further refined by the combination of a node representing a non-textual rule. Such an arrangement is represented in FIG. 5. Looking to that figure, a net represented in general at 66 is seen to comprise positive node 68, again referring to resumes exhibiting technical experience in connection with Microsoft systems; a positive node 70 loaded with attractor material representing experience in a Unix environment, and negative node 72 which is loaded with negative attractor(s) representing candidates with no technical experience. Nodes 68 and 70 are associated by an interaction represented at line 74. Nodes 68 and 72 are associated by an interaction represented at line 76; and nodes 70 and 72 are associated by an interaction represented at line 78. Net 66 also incorporates a negative rule node 80. For the resume example at hand, node 80 represents a criterion that resumes having a date of Jan. 1, 2003 or earlier are to be aborted. Node 80 is seen associated with node 68 by an interaction represented at line 82. The analysis now shows a document represented at symbol 84 having promise of indicating good information, while document symbols 85 and 86 tend to have only minor importance to the search. However, documents 87, 88 and 89 are aligned on interaction line 82 and are somewhat closely associated with the cutoff date represented at rule node 80.

Figure 6:
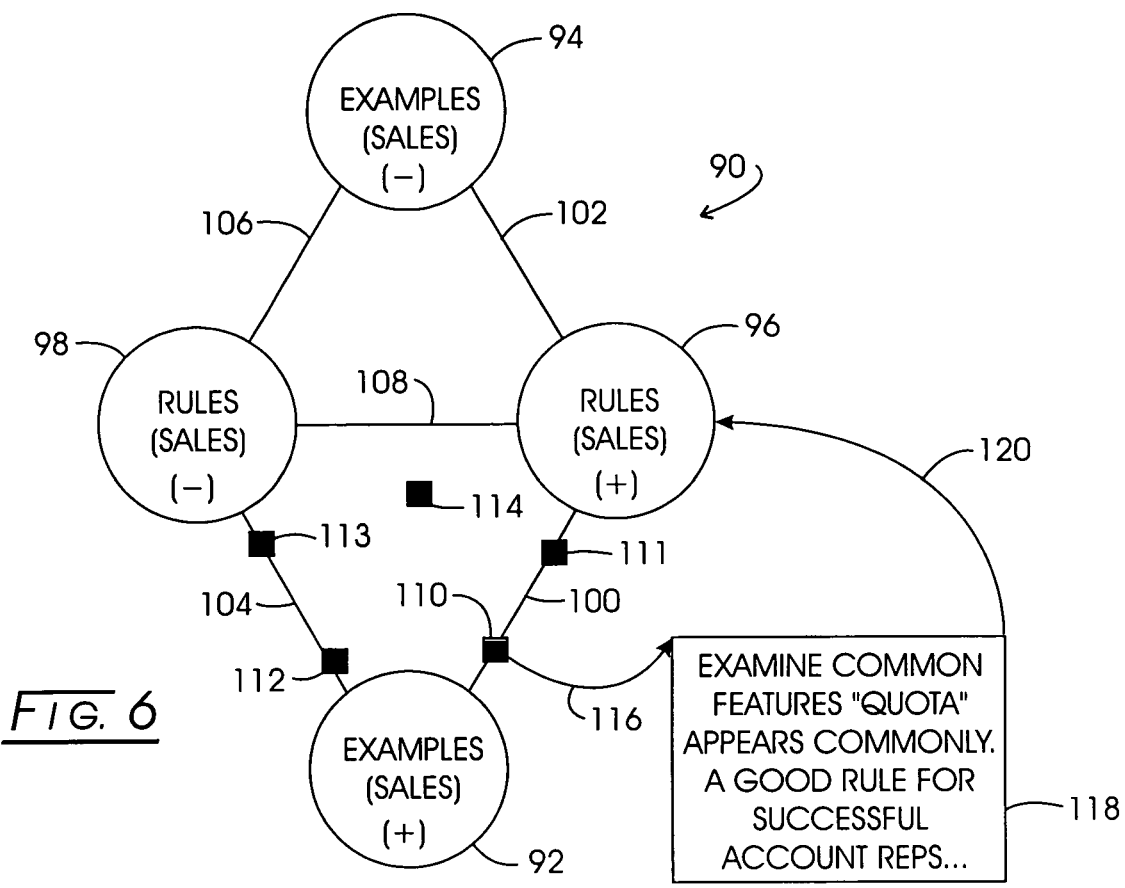
FIG. 6 is a schematic representation of the refinement features of the invention showing the utilization of common features to define text example nodes into rule base nodes.

Referring to FIG. 6, a net refinement system is represented generally at 90. System 90 again is concerned with resumes with an objective of locating the resumes of candidates having previous sales success. In this regard, good resume examples were loaded into a positive node 92 while correspondingly poor resume examples for sales persons were loaded into a negative node 94. These examples as loaded into nodes 92 and 94 were then refined to develop a positive rule based node for finding good sales persons as represented at node 96 and a negative rule for discarding resumes of salesmen evidencing less than desirable capabilities as represented at node 98. Nodes 92 and 96 are shown associated by an interaction represented at line 100. Nodes 94 and 96 are shown associated by an interaction represented at line 102. Nodes 92 and 98 are shown associated by an interaction represented at line 104. Nodes 94 and 98 are shown associated by an interaction represented at line 106 and rule nodes 96 and 98 are shown associated by an interaction represented at line 108. Document symbols are represented in the figure at 110-114. Refinement, for example, leading to the rule node 96 were carried out by examining the common features or attributes, i.e., features which appeared commonly within "good" documents adjacent node 92. Thus, the rule nodes as at 96 and 98 are developed by starting with examples and refining towards rules. This common feature function is employed to identify attributes in a region of the net from which new generalizations may be made. Accordingly, as represented at arrow 116, block 118 and arrow 120 documents as at 110 were examined for common features, which included the word "quota". In the resume based exemplar under discussion, a rule was developed that good salesmen will have produced resumes which describe their having met previous quotas. Thus the rule node 96 evolved with a "quota" attractor. By contrast, the negative node 98 developed a rule that the term "quota" was not present in the resume document.

Figure 7:
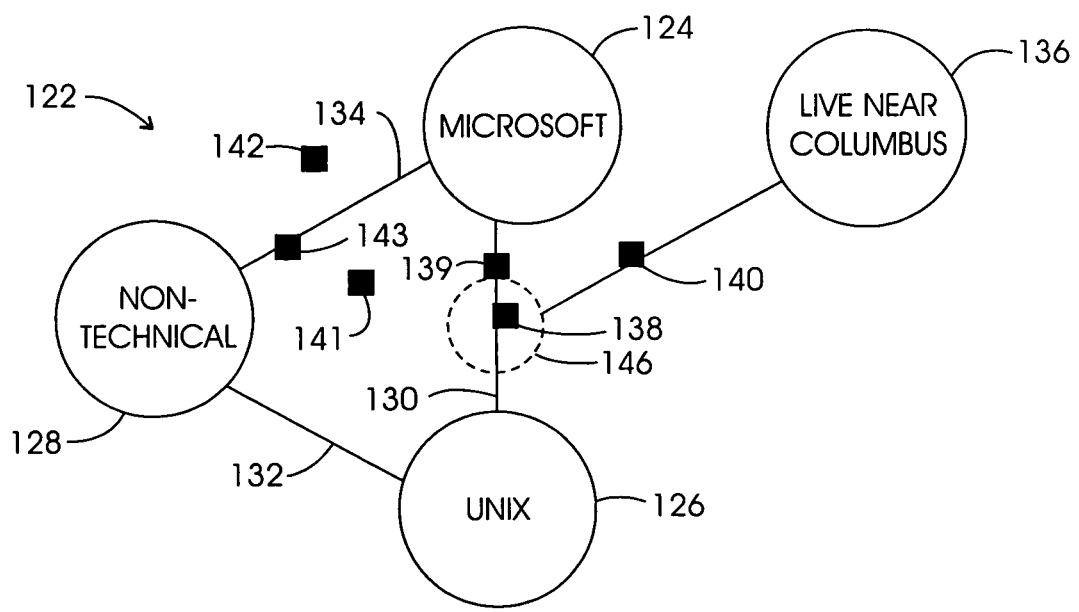
FIG. 7 is a schematic representation of a net according to the invention showing the three node net of FIG. 4 in combination with the development of a pseudo node.

From time to time, document symbols may be somewhat clustered about a desirable region of an interaction line. Those documents may commonly exhibit a desirable attribute which approaches a rule. Looking to FIG. 7, a net is represented generally at 122 which is similar to net 44 described in connection with FIG. 4. In this regard, the net 122 includes positive node 124 representing a technical experience with Microsoft systems. Spaced from the node 124 is a positive node 126 representing resume content showing experience in connection with Unix systems. On the other hand, a negative node 128 is configured to attract undesirable resumes representing candidates with no technical experience. Nodes 124 and 126 are associated by an interaction represented at line 130; nodes 126 and 128 are associated by an interaction represented at line 132; and nodes 124 and 128 are associated by an interaction represented at line 134. The figure reveals a positive node 136 having a criteria representing that the candidates for employment live near a desirable locale. Document locations are shown at document symbols 138-143.

The user may seek to further resolve documents, for example, those at 138, that currently have similar locations. One way to achieve this entails the creation of a pseudo-node, which is created from all of the documents in a geometric region, as indicated by the dashed circle 146, and the enclosed documents 138. By then connecting the pseudo-node 146 to a node that attracts (e.g.) cities in the Columbus, Ohio region, the user may achieve an additional resolution of documents that were previously considered similar by the net potential. The documents previously at 138 that are now attracted towards the "Live near Columbus" node are displayed at 140.

The method of the invention also permits the development of visually perceptible correlations between and among two or more nets. Looking to FIG. 8, such an arrangement is depicted with a net 150 which is identical to net 122 (FIG. 7) and a two node rule based net represented generally at 152. Looking to net 150 and again considering the resume based example, a node 154 will attract employment candidates having experience in the Microsoft system. In similar fashion, a positive node 156 will attract resumes of employment candidates having experience with the Unix system. As before, it may be desirable to exclude candidates with no technical experience and thus a negative, non-technical node 158 may be developed to attract generally undesirable resumes. An interaction associating nodes 154 and 156 is represented at line 160. An interaction associating node 156 and 158 is represented at line 162; and an interaction associating node 154 and negative node 158 is represented at line 164. A positive node 166 will have been developed with a desirable residence locale attribute. Documents are represented by document symbols 168-173. As before, the textual or rule data of node 166 is employed as represented at line 176 is connected to a pseudo-node represented at dashed circle 178.

Net 152 is comprised of positive node 180 representing a desirable rule, for example, the node containing the term "quota". Similarly, the network 152 includes a node 182 representing a negative rule for sales, for example, documents which do not contain the term "quota". Nodes 180 and 182 are associated by an interaction represented at line 184 and document symbols are identified at 186-188.

Using correlation procedures with a document identification or I D attribute. Desirable document 186 can, for example, be correlated with the same document as it may appear in net 150. For example, document symbol 186 is correlated with document symbol 170 as represented by a correlation line 190 which will appear with nets 150 and 152 on the computer display. Similarly, that document or documents represented at symbol 186 may be associated, for example, with the document or documents represented at symbol 173 in net 150. The correlation line will be observed on the computer display as represented at line 192. Correlations serve to connect two distinct organizations of the documents at hand; in practice this is valuable when evaluating simultaneous criteria or examining trade-offs between conflicting criteria.

In the flowchart-based discussion to follow certain blocks within some of the flow charts are associated within small symbols to identify what aspect of the overall method is involved. For example, where user interaction is involved, the user interacting, for example, with the computer display and associated implements, then that block is associated with a small circle carrying the letters "UI". Where the flowchart block is concerned with the internal functioning of the computer system as opposed to user interaction, then the pertinent flowchart block is associated with a square symbol carrying the letters "SP" representing a system process performed entirely by the system itself without user interaction except to initiate the process. Where a pertinent block in a flowchart is associated with a hexagonally shaped symbol carrying the letters "BP" then the method function is one associated with the underlying business or endeavor and is a process performed by the user(s) entirely outside of the boundaries of the system at hand. Using the resume search example, such an activity may be the delivery of "good" resumes and/or "bad" resumes.

Figure 9A:
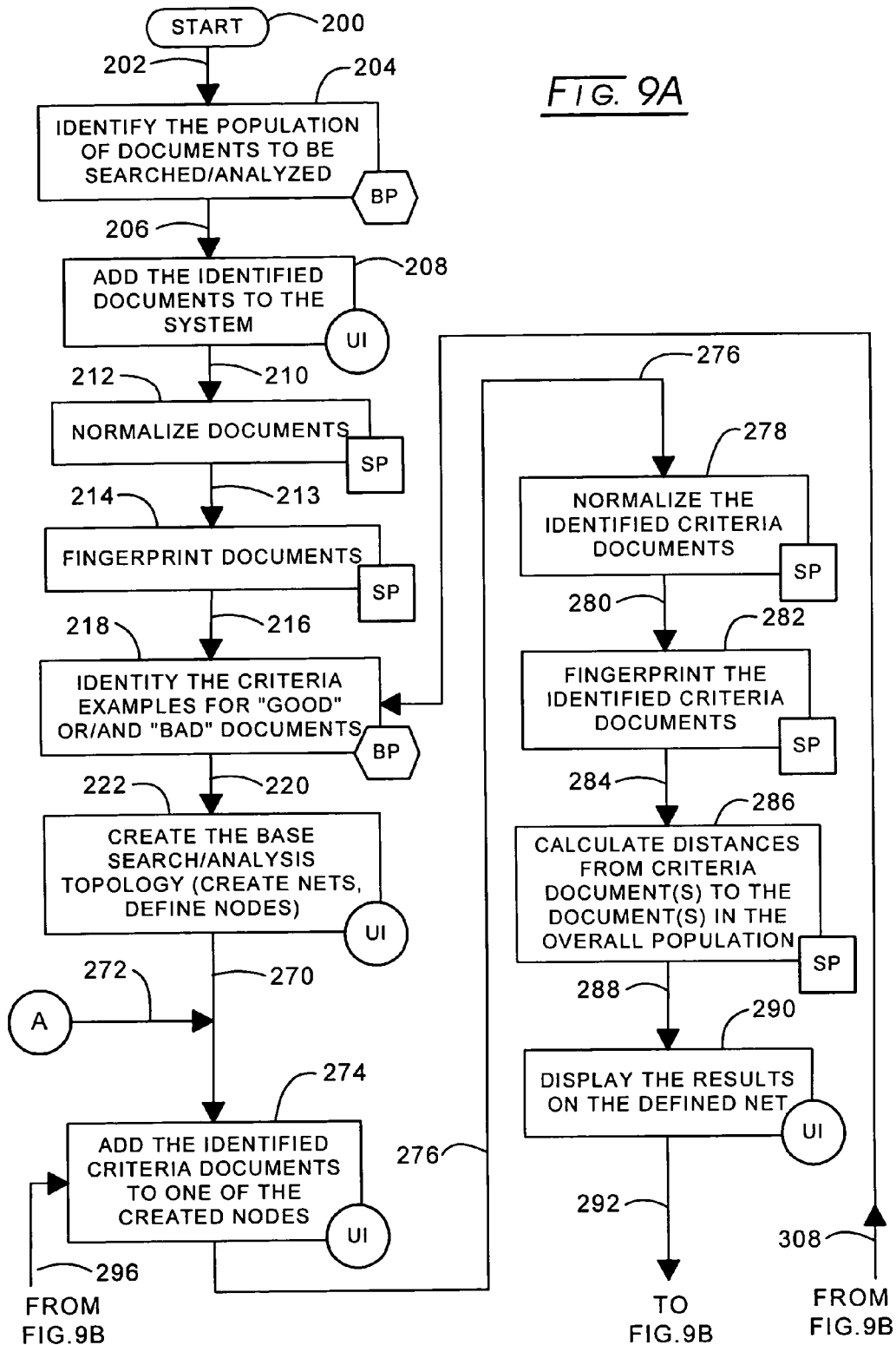

FIGS. 9A and 9B combine as labeled thereon to provide a flow chart describing the overall method of the invention. Looking to FIG. 9A, the overall process is seen to commence at start node 200 and line 202 extending to block 204. Block 204 calls for an identification of the population of documents to be searched or analyzed under the precepts of the invention. As noted above, these documents may be files, files convertible to text, data from relational DBMS, binary files, images and the like, i.e., any unit on an information system containing symbolic data. Note that the block 204 is associated with a BP symbol. Next, as represented at line 206 and block 208 the identified documents or document population is gathered from the database into the system. Very often, this is carried out by the user adding the documents to the system and thus, the small symbol carrying the letters UI is annexed to block 208. Upon being entered into the system, the documents then are normalized as represented at line 210 and block 212. This is a system aspect of the method and thus, an SP symbol is annexed to block 212. Following normalization, as represented at line 212 and block 214, utilizing generally conventional techniques, the documents are fingerprinted, a function of the computer system. Thus an SP symbol is annexed to block 214.

Figure 10:
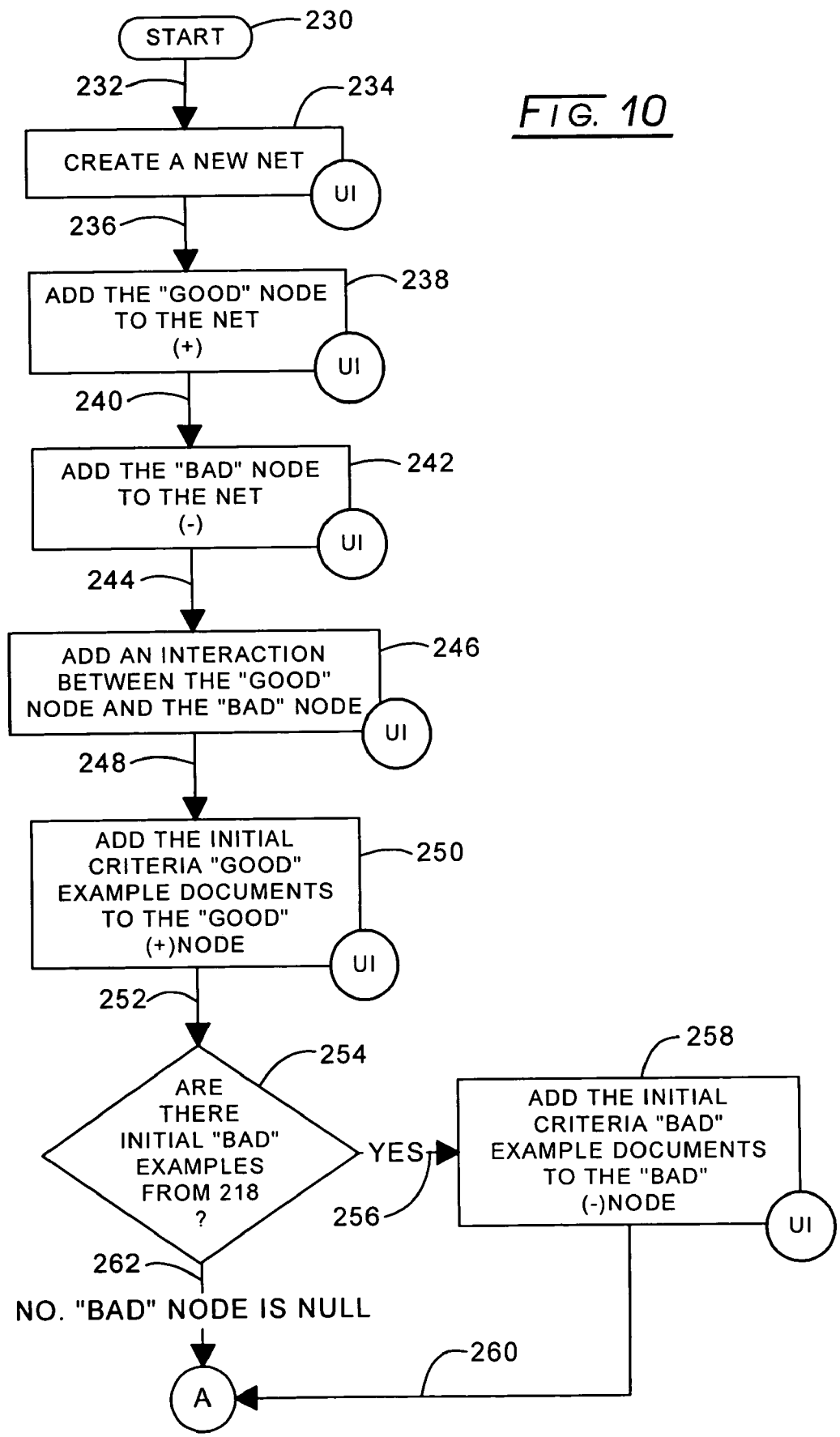
FIG. 10 is a flowchart illustrating the creation of base search/analysis topology according to the invention.

Documents having been gathered into the system and initially treated, the method then proceeds as represented at line 216 and block 218 to identify the criteria examples for "good" and/or "bad" documents. This initial criteria may be in addition to an example document, an example paragraph, an example sentence, a key word or the like. As represented by the BP symbol, initially these criteria are submitted by the requesting entity or business. For example, the business organization may supply the user with "good resumes" and "bad resumes". Next, as represented at line 220 and block 222 carrying a UI symbol, the basic search/analysis topology is created. In this regard, nets are created and nodes are defined Turning momentarily to FIG. 10 the subject matter of block 222 is revealed at an enhanced level of detail. In the figure, a start node 230 is revealed in connection with line 232 extending to block 234 carrying a UI symbol and calling for the creation of an initial or a new net. Then, as represented at line 236 and block 238, again as a user interface activity, a "good" or positive node is added to the net. Next, as represented at line 240 and block 242 containing a UI symbol, a "bad" or negative node is added to the net.

As noted earlier, an interaction must be established between nodes in accordance with the method of the invention. Accordingly, as represented at line 244 and block 246 carrying the UI symbol, an interaction is established between the "good" or positive node and the "bad" or negative node. That interaction appears as a line between the nodes at the computer display, the latter nodes being preferably represented as circles. The interaction having been drawn, then as represented at line 248 and block 250, also carrying a UI symbol, the initial criteria is loaded into the "good" or positive node. For the resume example, good resumes or text components thereof may be utilized for this initial loading procedure. The method then continues as represented at line 252 to the query posed at block 254 determining whether "bad" documents were made available in connection with block 218 of FIG. 9A. In the event of an affirmative determination, then as represented at line 256 and block 258 carrying a UI symbol, the initial "bad" criteria or document is loaded to the negative or "bad" node. The program then reverts to flowchart node A as represented at line 260. Where the determination of block 254 is that there are no "bad" examples provided by the business process, then as represented at line 262 the negative node is constituted as a null node as described in conjunction with FIG. 2 and the method reverts to flowchart node A.

Flowchart node A reappears in conjunction with line 272 in FIG. 9A. Returning to that figure, line 272 is seen extending to line 270 which, in turn, extends to block 274 carrying a UI symbol and providing for the addition of criteria to one or more of the created nodes. Note that the provisions of block 274 permit the iteration of criteria addition such that the node quality is refined toward a rule function as generally discussed in connection with FIG. 6. The method then continues as represented at line 276 to the system processing represented at block 278, carrying the symbol SP, where the identified criteria documents are normalized. Then, as represented at line 280 and block 282, again carrying a SP symbol, the identified criteria documents are fingerprinted. Following this conventional fingerprinting procedure, as represented at line 284 and block 286, carrying the SP symbol, and provides for the calculation of the relative distances from the nodes or criteria documents to the documents in the overall population. In general, each document will be displayed as a dot at the computer system display screen, which dot will be located a geometric relative distance from an attracting node. As part of the method, the user then views this display and forthwith will be able to evaluate the initial criteria utilized by virtue of these dot manifested documents as they are located with respect to the nodes of each net. Accordingly, as represented at line 288 and block 290, the results are displayed on the defined net. Note that block 290 is associated with a UI symbol indicating that the user now will determine whether more criteria is needed. In this regard, line 292 extends from block 290 to the query posed at block 294 providing for a user determination as to whether more criteria is called for loading the nodes. In the event of an affirmative determination, as represented at lines 296 and 298 the method reverts to block 274 with the addition of identified criteria documents to one of the created nodes.

Where the determination at block 294 is that more criteria is not called for then the procedure extends via line 300 to block 302 carrying a BP symbol. Block 302 calls for a visual examination of the display with respect to the business process at hand. Thus the entity commissioning the search is called upon to make a determination as to whether the search at the present time meets its requirements. Accordingly, as represented at line 304 and block 306 a query is posed as to whether the search as it then exists should then be refined. In the event of an affirmative determination, then as represented at line 308, the method returns to block 218 calling for the business development of further criteria examples. On the other hand, the user may wish to concentrate on a cluster of document symbols which are close to a node of desired content. For example, as seen at document symbols 38-40 in FIG. 3 or symbols 58-60 in FIG. 4. Accordingly, where a determination made in conjunction with block 306 that refinements should not be made at the present time, then the method continues as represented at line 310 and block 312, carrying the UI symbol. Block 312 calls for drawing, at the computer system display, boundaries finding a region containing desirably positioned document symbols. In this regard, one or more of those documents can be pulled out for display and may be found adequate for concluding the search. Accordingly, the method may, as represented at line 314 and block 316 provide a report representing the conclusion of the search. Note that block 316 carries a UI symbol. Among the reports that can be generated are bar charts showing the extent of attraction to various nodes by documents identified in the search. As represented at line 318 and node 320 the method or program will then end.

Returning to block 312, upon delimiting the noted region at the computer system display, the user may then, as represented at line 322 and block 324, carrying a UI symbol, view a detailed list of documents that fall within the noted region. The user then has, in effect, two options as represented at lines 326 and 328. Line 326 extends to block 330 carrying a UI symbol, and provides for viewing the contents of a specific document at the computer system display. With this viewing procedure, it is entirely possible that new criteria may be developed for further refinement as represented at lines 332, 334 and block 336. Note that block 336 is associated with a BP symbol. With the identification of this new criteria for further refinement and search/analysis, as represented at line 298, the method reverts to block 274 and the addition of the identified new criteria to one of the created nodes.

Figure 8:
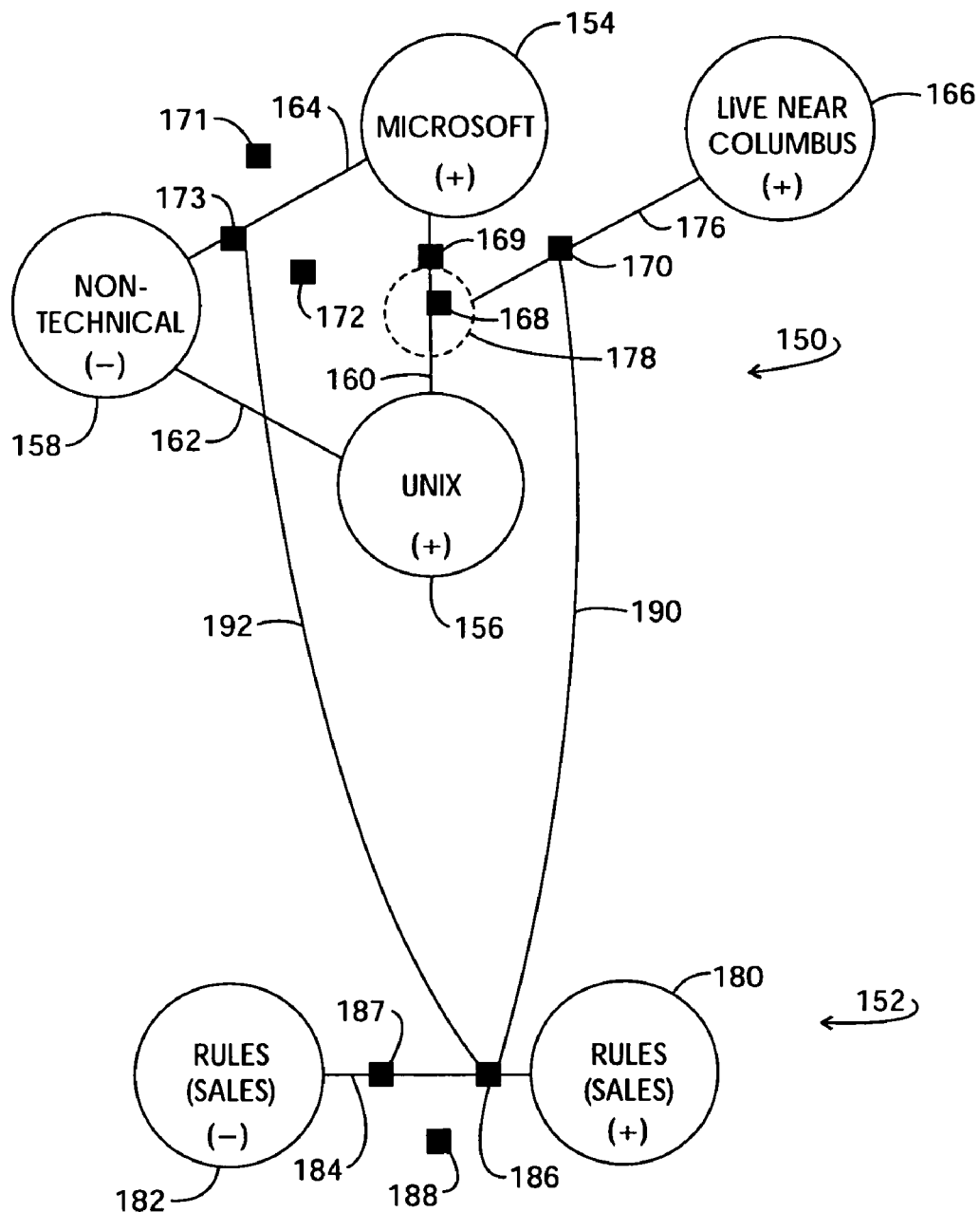
FIG. 8 is a schematic representation of a correlation procedure according to the invention involving two nets and showing schematic correlation lines.

The second option associated with block 324, as represented at lines 326 and 328 is set forth at block 340, carrying a UI symbol. At this block 340, as discussed generally in connection with FIG. 6, the method provides for the identification and viewing of a list of features common to the documents that fall into the region delimited in connection with block 312. For example, the documents involved may share phrases. Utilizing the noted resume search example, the documents may share the phrase "sales representative". Identifying this commonality can be carried out in a variety of techniques, for example, the user may wish to identify common features of the documents within the limited region but which are not present in the overall document population. On the other hand, such common features as the word "the" can be removed. As noted earlier herein in connection with FIG. 6 for the resume example, the word "quota" became a refinement using this common feature approach which resulted in a rule defining positive node. As part of this approach to looking to common features, where more than one net is present at the computer system display, correlations between and/or among documents within the nets may be developed. For this purpose, the attributes and attribute values for each document, as discussed generally in connection with FIG. 8, are employed as described in detail later herein. Following this commonality approach, as represented at lines 332, 334 and block 336, the new criteria is identified and submitted as represented at line 298 to the criteria addition step represented at block 274.

The normalization of documents has been described in conjunction with FIG. 9A at blocks 212 and 278. Normalization according to the method of the invention is particularly adapted for the conventional fingerprinting function which follows.

Figure 11:
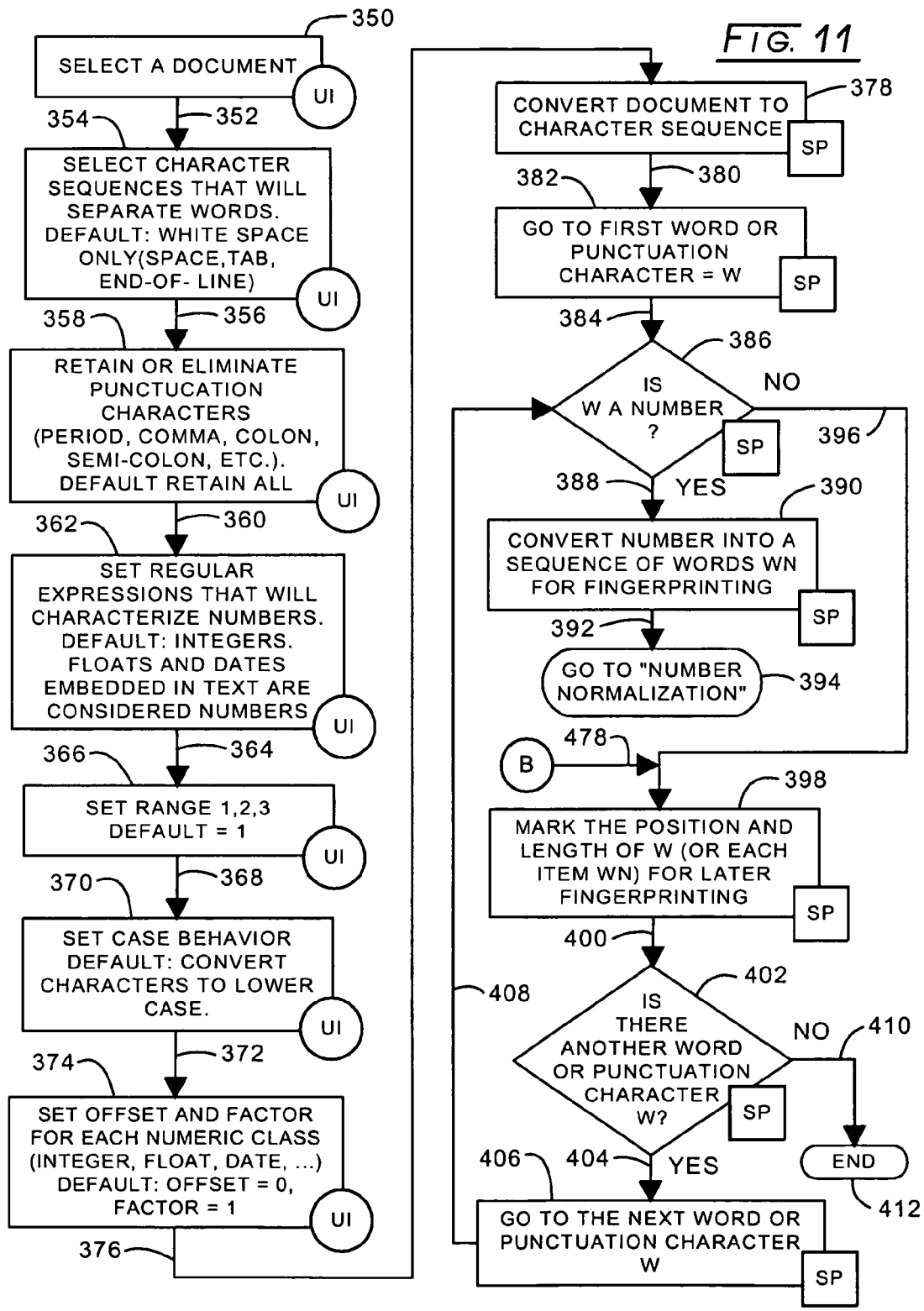
FIG. 11 is a flowchart illustrating document normalization for fingerprinting in accordance with the method of the invention.
Figure 12:
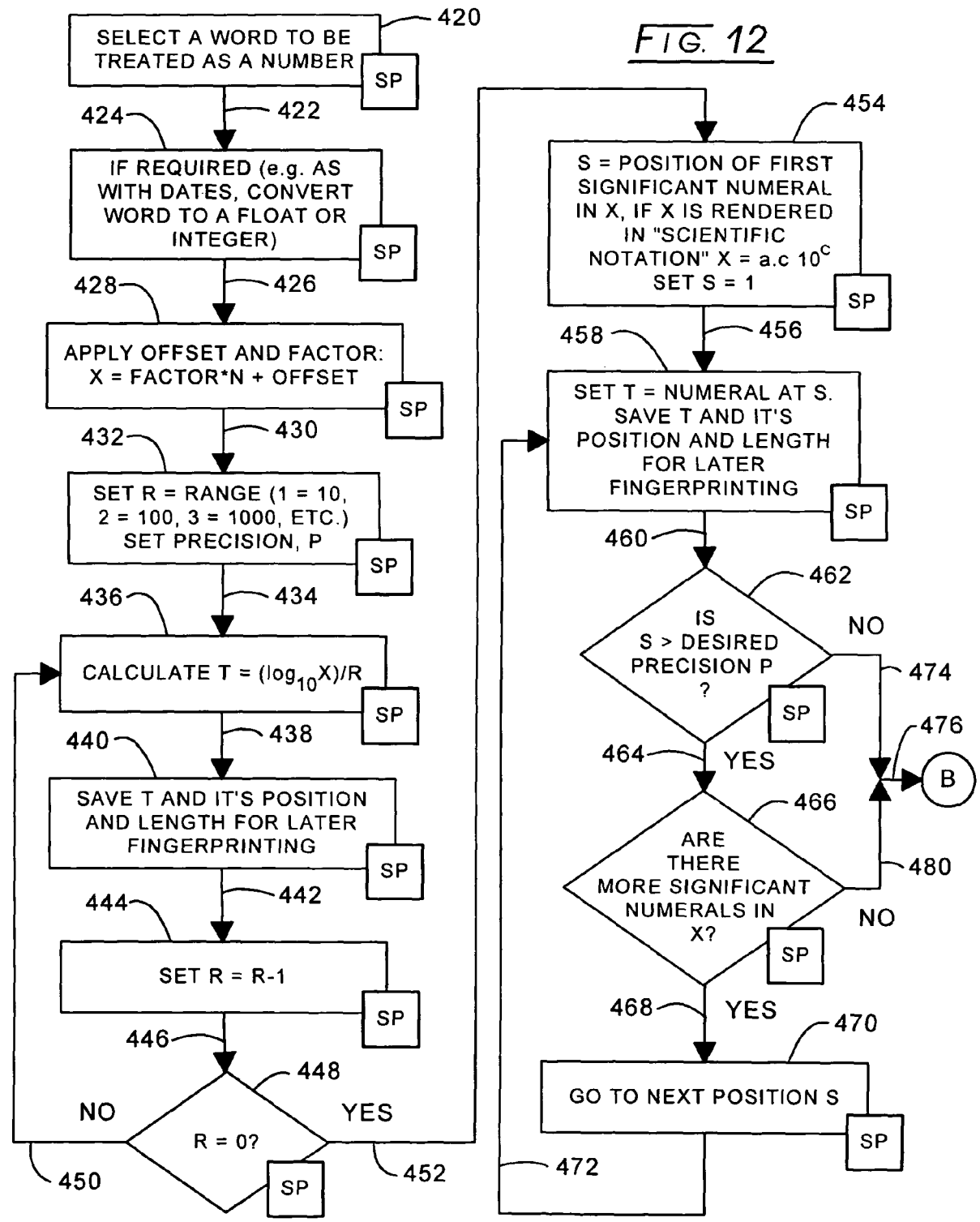
FIG. 12 is a flowchart showing the technique of number normalization according to the invention.

Referring to FIG. 11, a flowchart describing document normalization according to the invention is set forth. In the figure, a document is selected as represented at block 350 carrying a UI symbol. Then, as represented at line 352 and block 354, the sequences that will separate words are identified. As noted, the method will default to a white space (one or more successive blanks, tabs or end-of-lines). The block also carries the UI symbol. Next, as represented at line 356 and block 358 the user, as indicated by the UI symbol, determines whether to retain or eliminate punctuation characters such as periods, commas, colons, and the like. When a default is employed, or "by default", the system will retain all such punctuation characters. Each removed punctuation character is replaced with a word separator character (e.g., blank). Line 360 extends from block 358 to block 362 providing for the setting of a regular expression or series of regular expressions that identify numbers. These well-known expressions define a sequence of characters defining (in this case) a number. For the instant method, numbers are treated as a special case, inasmuch as the search technique will evolve overlays or potentials with respect to them. By default floats and dates embedded in text are considered numbers. Note that block 362 carries a UI symbol. Next, as represented at line 364 and block 366 a range is set. This range is a number 1 or more and determines how far apart two numbers can be, still having some overlap during the search process. In this regard, a "1" range implies overlap for two numbers within a factor of 10, a "2" range implies overlap for two numbers within a factor of 100, and so forth. The default for this step in the method is 1. Note that block 366 is associated with a UI symbol and following the setting of range, as represented at line 368 and block 370, the case behavior is set. In this regard, a determination is made by the user as indicated by the UI symbol as to whether, for example, all characters are to be converted to lower case. In the latter regard, that is the default condition at this block. The method then continues as represented at line 372 and block 374. The offset and scale or factor for each numeric class is set. In general, the method can have a different offset for each numeric class (e.g. dates, real numbers, integers). As a default, the offset is set to 0 and the factor or scale is set to 1. These components permit some adjustment of the numeric potential that is created permitting the adjustment of numeric overlap (e.g. whether overlap will extend from the ranges 10-100, 100-1000 . . . or from 5-50, 50-500, 500-5000 . . . ). Note that block 374 also is associated with a UI symbol. However, for the remainder of the flowchart, all blocks are associated with the system process symbol, SP. From block 374, as represented at line 376 and block 378, the document is converted to a character sequence. This is, for example, a straightforward conversion from a word processing document to text; from a PDF file to text and the like. Next, as represented at line 380 and block 382 the system goes to the first word or punctuation character which is defined as W. Punctuation characters are treated as words unless they are part of a larger recognized sequence. For example, for the number 1.2345, the period (decimal point) is part of that number. The system then, as represented at line 384 and block 386, poses a query as to whether W is a number. In effect, the determination is made with respect to the subject matter of block 362. If a number is at hand, then as represented at line 388 and block 390 the number is converted into a sequence of words, WN for fingerprinting purposes. Then, as represented at line 392 and flowchart node 394 the system turns to a number normalization procedure discussed in connection with FIG. 12.

Where the token at hand is not a number, then as represented at line 396 and block 398 the position and length of the word, punctuation character W or word number WN are marked for later fingerprinting. The method then proceeds as represented at line 400 and block 402 wherein the question is presented as to whether there is another word or punctuation character, W. In the event that there is, then as represented at line 404 and block 406 the system goes to the next word or punctuation character, W and loops as represented at line 408 to the query posed at block 386. Where no further word or punctuation character, W is present in the document selected, then the routine at hand ends as represented at line 410 and flowchart node 412.

Where the program reaches node 394 indicating that a number is at hand and number normalization is called for, then the routine illustrated in the flowchart of FIG. 12 is turned to. Looking to that figure, note that all blocks are identified with the system process symbol, SP. The program commences with block 420 providing for the selection of an item or word to be treated as a number. Then, as represented at line 422 and block 424 where required as in the case with dates, the number word is converted to a float or integer. Following such conversion if required, the program continues as represented at line 426 and block 428. An offset and factor is applied wherein the result, X is equal to the factor multiplied times the number N plus the offset. The program then continues as represented at line 430 and block 432. The range elected in connection with block 366 in FIG. 11 is set and a value for precision, P is set. The program continues as represented at line 434 and block 436. Derivation of the then representation of the number, X, at hand is commenced. In this regard, a quantity, T is calculated as the log to the base 10 value of X divided by the range, R. As an example, should the factor equal 1; the offset equal 0; and the range equal 2, for a number, $X=1.2\times10^6$, the first digit of the normalized representation will be 3. Next, as represented at line 438 and block 440 the quantity T, its position and length are saved for later fingerprinting. Next, as represented at line 442 and block 444 the range, R is decremented by 1 and the program continues as represented at line 446 to the query posed at block 448 determining whether or not the range value, R, has been decremented to 0. Where it has not reached the value 0, then the procedure loops as represented at loop line 450 extending to block 436. For the above example, the value of R now will be 1 and the next number of the normalized representation of the exemplar number will be 6.

Where the range, R, has incremented to 0, then as represented at line 452 the procedure extends to those components of the number at hand which are non-exponential in nature. Line 452 extends to block 454 where the value, S, is set as the position of the first significant numeral in the number X where that number is rendered in scientific notation as set forth in the above numeric example. The procedure then continues as represented at line 456 and block 458 wherein the quantity T is set as the numeral at S. that value and its position and length are saved for later fingerprinting. For the example at hand, the numeral will be 1 and the normalized representation of the exemplar number now has accumulated to: 3 6 1. The program then continues as represented at line 460 and block 462 wherein the query is posed as to whether S is less than the desired precision, P. In effect, the program sequences through the significant numbers until the precision number is reached. For the example at hand, assume a precision, P of 4. Where the position, S, is less than the desired precision, P, then the program continues as represented at line 464 to the query posed at block 466. At block 466 a determination is made as to whether there are more significant numerals in the number at hand, X. With an affirmative determination, the program continues as represented at line 468 and block 370 providing for progressing to the next position, S. The program then loops as represented at line 472 to block 458. For the example at hand, with the precision of 4, the normalized representation of the exemplar number will be: 3 6 1 2 0 0 the tokens following the exponentially based numbers 3 6 being the first four significant numerals in the number 1200000.

Returning to block 462 where a determination is made that the position, S is not less than the desired precision, P, then as represented at lines 474 and 476 the program ends as represented at flowchart node 478. Similarly, where a query posed at block 466 indicates that there are no more significant numerals in the number, X then the program reverts as represented at lines 480 and 476 to flowchart node B. Returning to FIG. 11, flowchart node B reappears in conjunction with line 478 extending to line 396.

Figure 13:
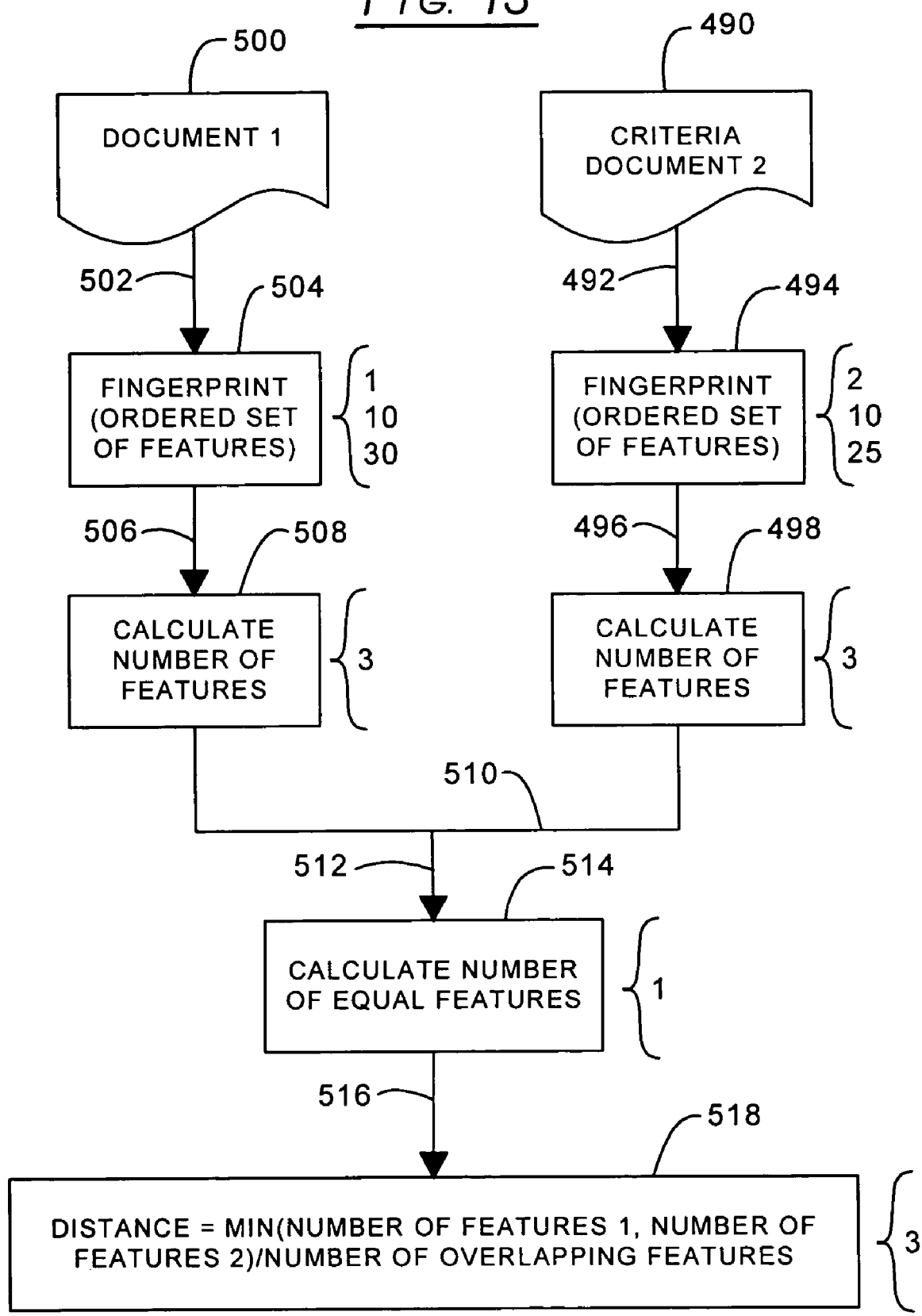
FIG. 13 is a flowchart illustrating a computation of the potential or distance according to the invention.

A conventional fingerprinting procedure has been described in connection with FIG. 9A at blocks 214 and 282. In general, that procedure will correspond with the following algorithm:

(1) Define a rule for what constitutes a word. Typically any sequence of white space is considered a separator. Punctuation elements may be eliminated but typically they are included as separate words.
(2) Set parameter R (resolution) (typically 3).
(3) Set parameter L (lookahead) (typically 4).
(4) Open the text stream.
(5) Set position pointer P=1 (first word).
(6) Read the next L words.
(7) For the word at P, generate a hash for each of the first N*R characters, and one for the word as a whole. (For example, for the word "their" with R=3, generate a hash for the sequence "the" and one for the sequence "their".) Each generated hash number is considered an internal attribute of the text stream.
(8) Generate hashes for the word sequences P P+1, P P+1 P+2, ..., P P+1 ... P+L. If punctuation appears in this sequence, it is typically treated as a separate word.
(9) P=P+1
(10) If P<end of document then (Go to (6)) else exit While the mathematical formality of computing potential or attractor has been discussed above, the methodology involved for this text overlap function can be described in conjunction with a relatively simple flowchart. In the formalism outlined above, this corresponds to the calculation of $=\Sigma_{dn}p(dn)F(Q(D),Q(dn))\Sigma_i\ qi(D)\ vi(r,dn,n)$ in equation (12), with the specific forms (16)-(21) in place. In FIG. 13, such a flowchart is revealed. The computation of potential or distances based on the document fingerprint is described above. Intuitively the function determines if the text in one document overlaps with another. A complete overlap gives a distance of 10.0. No overlap provides an infinite distance. The calculation of distances has been described in connection with block 286 in FIG. 9A. Looking to FIG. 13, a criteria document as represented at symbol 490 will have been developed as represented at block 218 in FIG. 9A. That document, as represented by arrow 492 and block 494 will have been normalized and fingerprinted. Those fingerprint based ordered set of features will be represented as a set of numbers and for exemplary purposes, a simplified set of features is shown adjacent block 494 as being 2, 10 and 25. The program treats these features, as represented at arrow 496 and block 498, by calculating the number of features present. For the simplified example at hand, that number of features will be 3 as represented adjacent block 498.

Next, for each document of the population of documents identified as described at block 204 in FIG. 9A, the same procedure is undertaken. For example, a document 1 is represented at symbol 500. As represented by arrow 502 and block 504 the document will have been normalized and fingerprinted such that it is represented as a fingerprint with an ordered set of features. Those features, for example, are shown as the number set 1, 10, and 30 as listed next to block 504. In accordance with the procedure, as represented at arrow 506 and block 508 the number of features in the fingerprinted document is calculated. Typically a page will exhibit about 100 features. Each one of these fingerprint numbers or features corresponds to the beginning of a word, a whole word, or several words in sequence. Thus, the feature set is representing textual content. Following the calculation of the number of features, as represented at lines 510, 512 and block 514, the number of equal, i.e., overlapping features is computed. For the simple demonstration at hand, as set forth adjacent block 514, the number of such equal features is 1. As represented at line 516 and block 518 the computed distance will be equal to the minimum of the number of features of document 1 or the number of features of document 2 divided by the number of overlapping features. For the demonstration at hand, the distance then will be 3 as set forth adjacent block 518.

Figure 14:
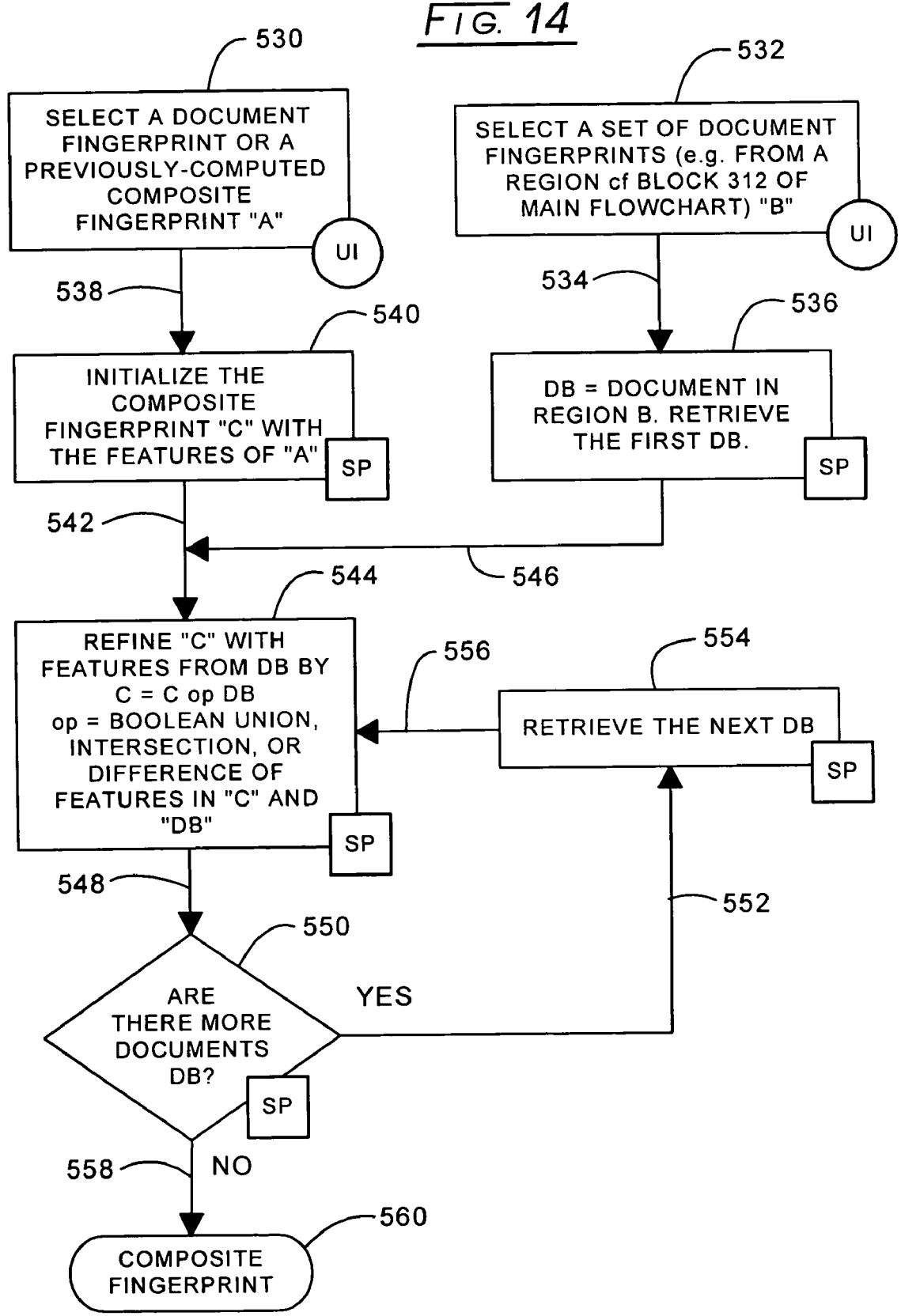
FIG. 14 is a flowchart illustrating operations upon fingerprinted documents to evolve a composite fingerprint.

As described, for example, at blocks 312 and 340 and in general in conjunction with FIG. 6, common features of documents can be combined with what may be categorized as fingerprint operations. Typically, the user will interface with the display by delimiting a computerized boundary around regions of document symbols which may be suspected as exhibiting either desired or undesired attributes. Those documents can then be refined to evolve what is referred to as composite fingerprint. A composite fingerprint is one that combines features from more than one document. In effect, the composite fingerprint does not correspond to any single document in the population. Looking to FIG. 14, block 530, having a UI symbol next to it, provides for a document fingerprint or a previously computed composite fingerprint, that component being identified as A. Adjacent block 530, block 532, also carrying a UI symbol provides for the selection of a set of document fingerprints by the user by delimiting a region at the computer system display wherein document symbols are present. That set of document fingerprints is generally categorized as B. As represented at line 534 and block 536 having an SP symbol annexed to it, a document DB within region B is retrieved, for example, the first document at the commencement of this procedure. Correspondingly, line 538 extends from block 530 to block 540 carrying the SP symbol. Block 540 provides for the initialization of the composite fingerprint, C with the features of either the document fingerprint or the composite fingerprint of A. In effect, the instructions at block 540 provide that C is equal to A. The program then progresses as represented at line 542 extending to the refinement block 544. Note that line 546 also extends to block 544 via line 542. The refinement procedure is one wherein the program is developing a composite of the elected A fingerprint and the elected document, DB from the B region. The composite fingerprint, C, will be a result of an operation carried out between fingerprint C and fingerprint DB. This operation is one involving Boolean algebra and the operation may provide a union, an intersection, or a difference of features of C and document DB. Note that block 544 carries an SP symbol. In general, the union of two fingerprints contains each feature (number) exactly once that appears in either fingerprint. On the other hand, an intersection may be employed to isolate desired criteria inasmuch as it will elect each feature that appears from the A fingerprint and the B fingerprint. A difference operation functions to remove feature numbers that appear in both the A fingerprints and the B fingerprints and may be used to remove common, spurious, or uninteresting features from a fingerprint.

Following this Boolean operation for, for example, the first fingerprint document in region B, as represented at line 548 and block 550 a determination is made as to whether there are more documents in the set of documents from region B. In the event such documents aren't present, then as represented at line 552, block 554, carrying an SP symbol and line 556 extending to block 544, the next document DB fingerprint is retrieved and the refinement procedure continues to evolve the composite fingerprint C.

In the event the query at block 550 results in a determination that there are no more documents in the B region set, then as represented at line 558 and flowchart node 560 a composite fingerprint then will have been developed.

With the derivation of a composite fingerprint it becomes necessary to evolve its utility. In this regard, the composite fingerprint represents a listing of features which will be undecipherable to the user. Accordingly, the need arises to reconstruct human readable text from the composite fingerprint. In particular, where there are longer sequences of words the system and method functions to endeavor to put those word sequences together for the user.

Figure 15A:
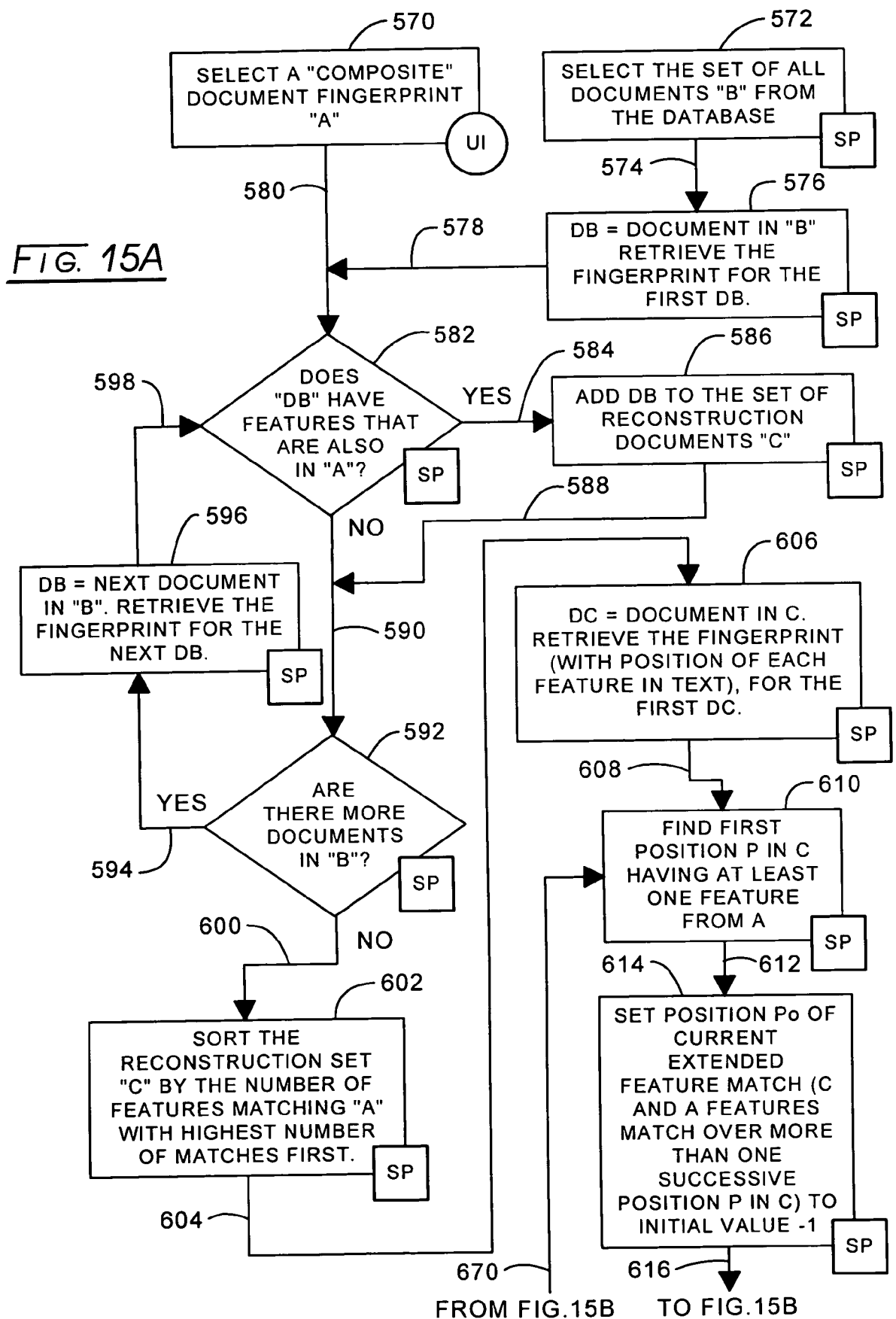
FIGS. 15A and 15B combine as labeled thereon to illustrate the utilization of a composite fingerprint to refine the net components of the invention.
Figure 15B:
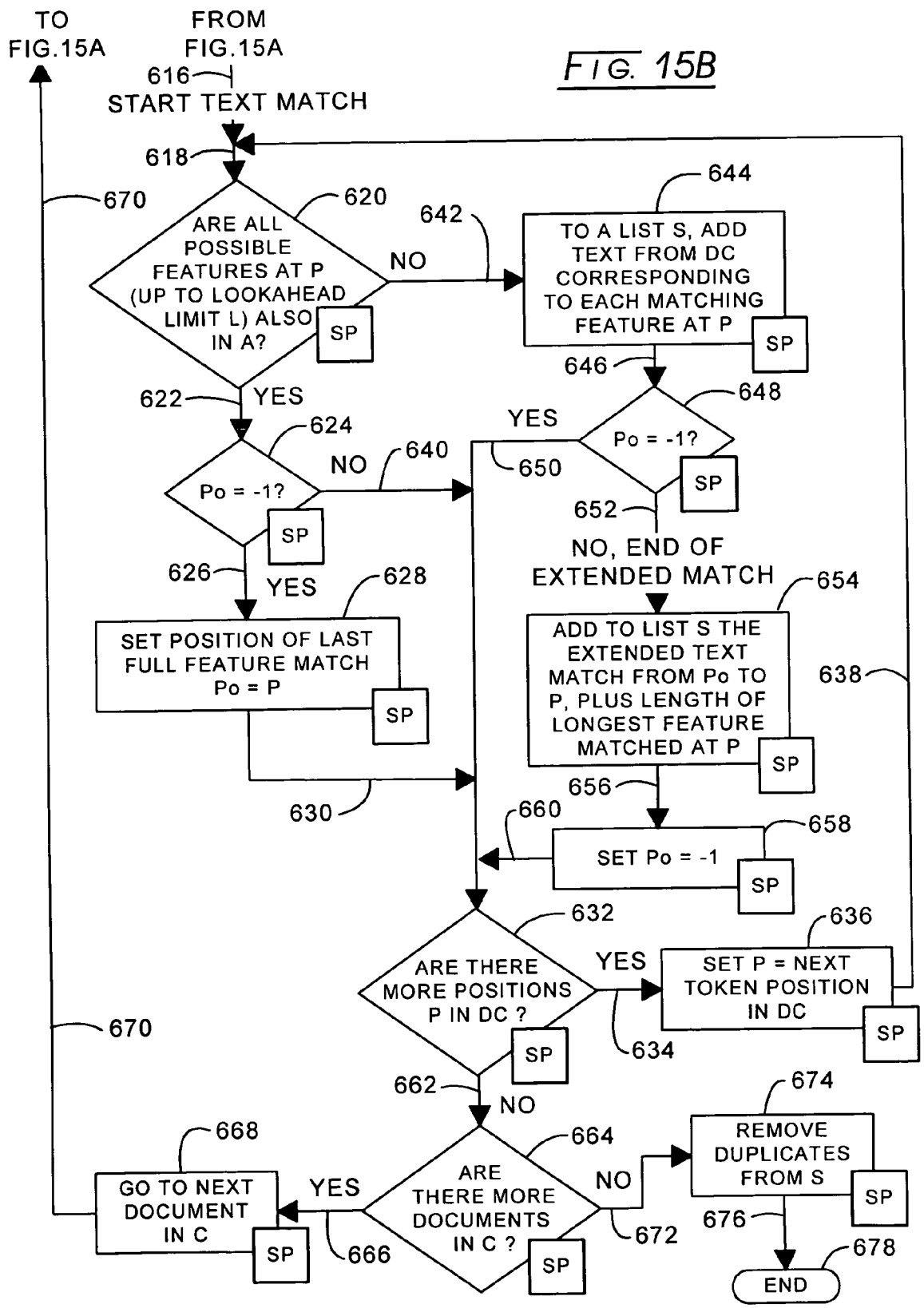

Referring to FIG. 15, this text reconstruction from a composite fingerprint approach is illustrated in flowchart fashion. In FIG. 15A block 570 provides for the user selection of a composite document fingerprint which is identified as A. Note that block 570 carries a UI symbol while all the remaining blocks of the instant flowchart are associated with a system process, SP symbol. Adjacent block 570, a block 572 provides for the selection of the set of all documents B from the database. Then, as represented at line 574 and block 576, DB is representative of a document in the setup of documents B. The fingerprint for the first of these documents DB is retrieved and the program continues as represented at line 578 extending to line 580. Line 580, in turn, extends from block 570 to block 582 wherein a determination is made as to whether a retrieved document fingerprint (DB) has features that also appear in the composite fingerprint A. Where that is the case, then as represented at line 584 and block 586 the evaluated DB document fingerprint is added to the set of reconstruction documents, C. The program then proceeds as represented at line 588 to line 590. Line 590 represents a condition wherein the document DB fingerprint does not have features that are present in the composite fingerprint A. Line 590 leads to the query posed at block 592 determining whether there are more documents, i.e. fingerprints in the B database. In the event that there are, then as represented at line 594 and block 596 DB is set as the next document in the B database and the fingerprint for the next DB is retrieved. The program then returns, as represented at line 598, to the query posed at block 582.

In the event that there are no more documents in the B database as determined at block 592, then the program continues as represented at line 600. At this juncture in the procedure, the list of reconstruction documents, C will have at least one feature incorporated within the composite document fingerprint A. It is desirable to develop a capability for looking at the text material of those documents that have fingerprints evidencing the most overlap with the features of the composite fingerprint. Accordingly, as represented at block 602 the reconstruction set, C is sorted by the number of features matching the composite document fingerprint A with the highest number of matches being located at the head of the list, i.e., first. Then, as represented at line 604 and block 606 for the document fingerprint DC in the reconstruction set C, the fingerprint, with the position of each feature in text, is retrieved for the first such fingerprint of the document in C. Then, as represented at line 608 and block 610 the first position P in the reconstruction set C having at least one feature from the composite fingerprint A is found. In effect, both position as well as feature number are retrieved. This position will be the first location in the reconstruction document where at least one feature from the composite document is present. That first position being located, then as represented at line 612 and block 614 an index, Po is located with respect to position P and is set to an initial value of −1. Next, as represented at lines 616, 618 and block 620, a determination is made as to whether all possible features at the position P are also in the composite document fingerprint A. This is bounded by a lookahead limit, L. This indicates a succession of common features. Where those features are in the composite document A, then as represented at line 622 and block 624 a query is made as to whether the index, Po is equal to −1. Where it remains at −1, then as represented at line 626 and block 628 the index Po is set to the value of the position of the last full feature match, or P. This indicates that there is a possibility of having a match of a number of words and it is desirable to track larger blocks of text. The program then continues as represented at line 630 leading to block 632 wherein a query is posed as to whether there are more positions, P in the reconstruction document DC. Where there are more such positions, P, then as represented at line 634 and block 636 the position P is set to the next token position in reconstruction document DC. Then, as represented at lines 638 and 618 a next word is considered and the query posed at block 620 is reasserted. As represented at block 624, where the index, Po is not equal to −1, then as represented at line 640 the program returns to line 630 and the query posed at block 632.

Returning to the determination at block 620, where all possible features at P up to the lookahead limits are not also in the composite document fingerprint A, then, as represented at line 642 and block 644 there is added to a list, S the text from reconstruction document DC corresponding to each matching feature at position P. The program then continues as represented at line 646 and block 648 where a determination again is made as to whether the index, Po is equal to −1. Where an affirmative determination is at hand, then as represented at line 650 extending to line 630, the procedure returns to block 632. Where the determination at block 648 is that Po is not equal to −1, then an end of the extended match is at hand as is represented at line 652 and block 654. The extended text match from index Po to P plus the length of the longest feature matched at position P are added to the noted list S. The program then continues as represented at line 656 and block 658. At block 658, the index, Po is reset to a −1 value and the program continues as represented at line 660 to line 630 and the query at block 632.

Where the query posed at block 632 indicates that there are no more positions P in reconstruction document DC, then as represented at line 662 and block 664 a query is made as to whether there are more documents in the reconstruction set C. Where more such documents are present, then as represented at line 666 and block 668 the program goes to the next document in the reconstruction set C and, as represented at line 670 returns to the operation at block 610.

Where the determination at block 664 is that there are no more documents in the reconstruction set C, then as represented at line 672 and block 674 duplicates are removed from the list S and, as represented at line 676 and flowchart node 678 this reconstruction program ends.

Figure 16B:
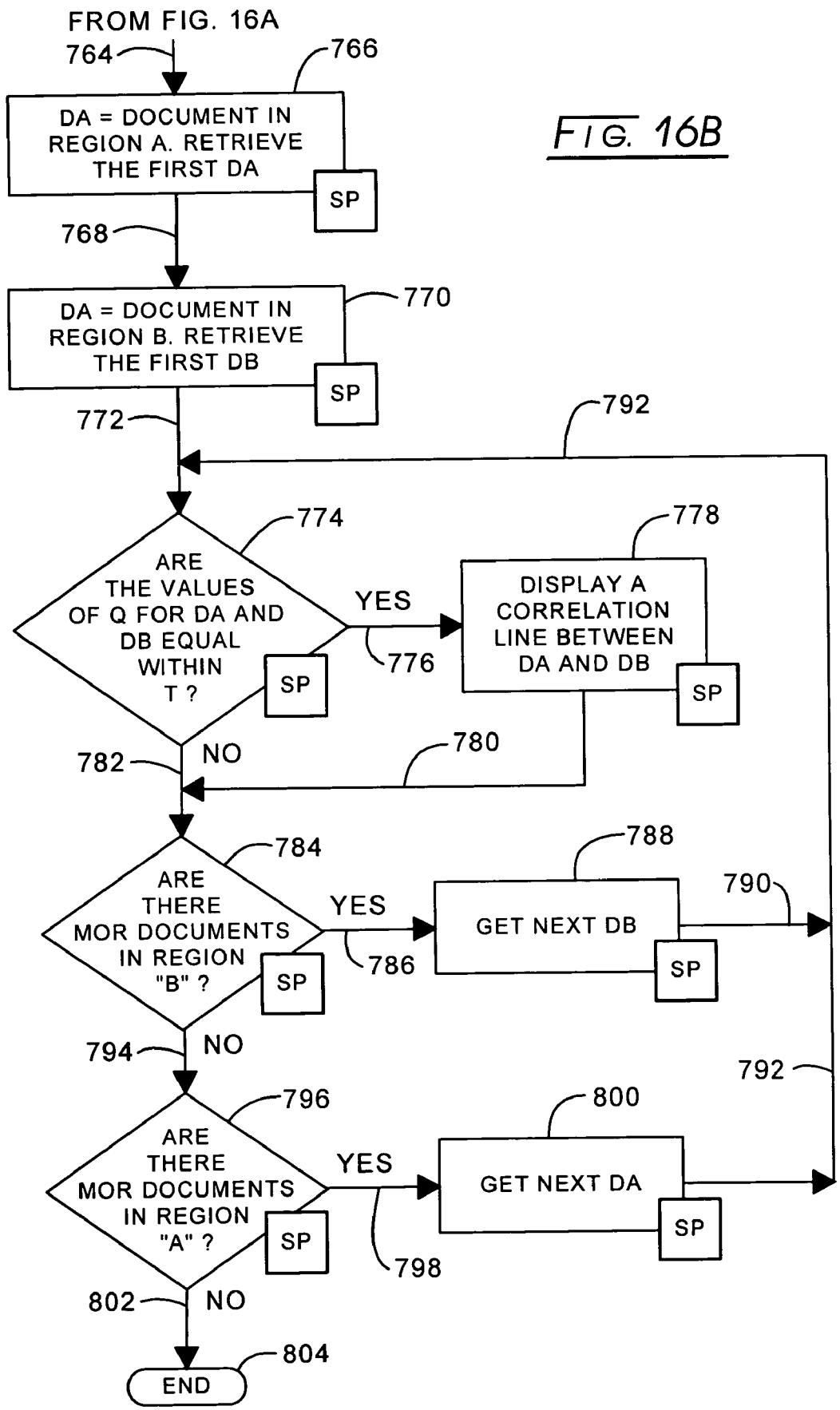
Figure 16C:
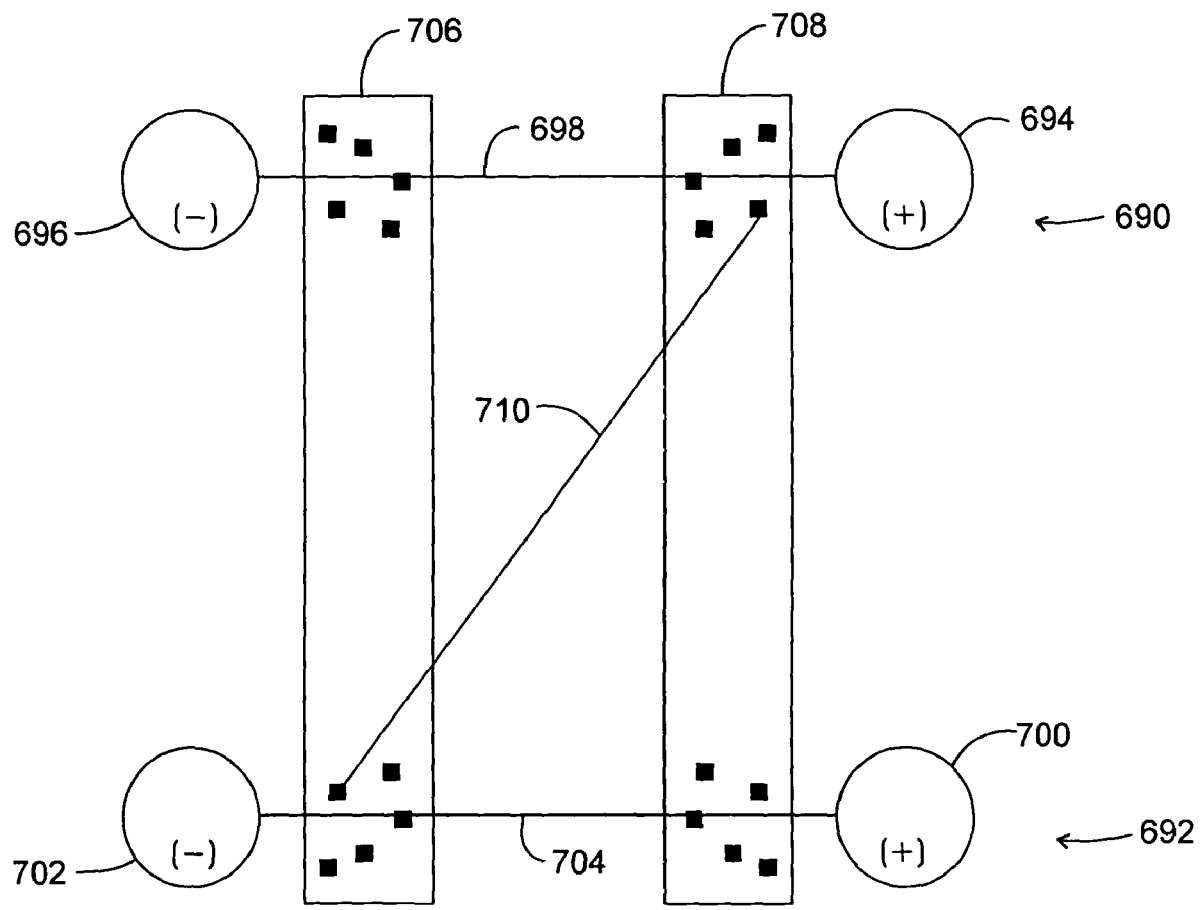
FIG. 16C is a schematic diagram of a display of two nets showing two user delimited regions and a correlation line.

Another refinement of the evaluation or search method of the invention has been described in connection with FIG. 8 wherein the computer system display can be employed in conjunction with two or more nets to develop visualizable correlations between documents or groups of documents. FIG. 16 presents a flowchart illustrating this methodology at a higher level of detail. The computer system displayed multiple nets and associated correlation diagrams identify a set of document pairs where the documents in any pair share a common attribute and attribute value. While the correlation pair may be visibly identified by any of a variety of computer display techniques, they are preferably displayed as a line connecting two or more document symbols and which extend between two different regions delimited by the user. Looking momentarily to FIG. 16C, a schematic representation of two nets at a computer display is provided. Those nets are generally identified at 690 and 692. In this regard, net 690 is seen to comprise a positive node 694 spaced from a negative node 696 and associated therewith via an interaction represented as a line 698. Correspondingly, net 692 is comprised of positive node 700 which is spaced from negative node 702 and associated therewith by an interaction represented by line 704. Working interactively with the computer system display, the user may, for example, create a region delimited by a computer drawn boundary shown in rectangular form at 706. Another such region may be created by the user as may be delimited, for example, by the rectangular boundary 708. Thus, two regions are developed. A region may encompass documents in one or more nets. Upon identifying the desired attribute and associated attribute value, the computer system will create a correlation line between two document symbols sharing the attribute and attribute value. Such a correlation line is represented at 710 extending between two document symbols at the two user delimited regions.

Now looking to FIG. 16A the correlation method commences as represented at flowchart start node 720 and line 722 extending to block 724. Note that box 724 is associated with a UI symbol and describes the creation of a region A that encompasses at least one document on one or more nets. Following creation of this region A, as represented at line 726 and block 728 a determination is made as to whether region A covers more than one net. For example, regions shown in FIG. 16C cover more than one net. Where the delimited region does cover more than one net, then as represented at line 730 and block 732 region A is mapped to a document set by the user by selecting a Boolean union or intersection of documents on different nets. Note that block 732 is accompanied with a UI symbol. With this procedure the union will emulate a logical ORing function, while the intersection will emulate a logical ANDing function. The program then continues as represented at lines 734 and 736. Returning to block 728, where region A does not cover more than one net, then as represented at line 736 and block 738 carrying a UI symbol, the user creates a region B that encompasses at least one document on one or more nets. It may be noted that regions A and B may coincident, overlap in part or be disjoint, i.e., located apart from each other as schematically illustrated in FIG. 16C. The method continues as represented at line 740 and block 742 wherein a corresponding query is posed as to whether region B covers more than one net. Where it does cover more than one net, then as represented at line 744 and block 746 associated with a UI symbol, the user maps region B to a document set by selecting a Boolean union or intersection of documents on different nets. The method then continues as represented at lines 748 and 750. Where the determination in connection with block 742 is that region B does not cover more than one net, then as represented at line 750 and block 752 carrying a UI symbol, the user selects the document attribute, Q to be correlated. It may be noted that experience with the method at hand resulted in an observation that the method may help entities organize data for putting it into a conventional relational data base. In this regard, internal attributes can be turned into external attributes such that the documents appear like the record of a conventional database.

From block 752 the method proceeds as represented at line 754 to the query posed at block 756. At block 756 the question is asked: "Are two attribute values within a tolerance considered equal?". In the event of a negative determination, the method continues as represented at line 758. With an affirmative determination at block 756, the method continues as represented at line 760 and block 762 associated with a UI symbol. At this juncture in the method, the user defines the tolerance, T for the selected attribute, Q and the method continues as represented at line 764.

The remaining blocks of the instant flowchart will be seen to carry the system process symbol, SP. Turning now to that portion of the flowchart, lines 758 and 764 converge at block 766 providing for the retrieval of the first document mapped in region A. Next, as represented at line 768 and block 770 a mapped document is retrieved from region B. As represented at lines 772 and block 774 a query is made as to whether the values of the attribute Q for documents DA and DB are equal within the tolerance, T, If they are, then as represented at line 776 and block 778, the system displays a correlation line between those documents DA and DB for viewing by the user. The program then continues as represented at line 780 extending to line 782. In the event of a finding of a lack of equality in connection with the query at block 774, then as represented at line 782, the program proceeds to the query at block 784 where a determination is made as to whether there are any more documents in region B available for correlation analysis. In the event of an affirmative determination, then as represented at line 786 and block 788, the next mapped document is retrieved and the program loops to line 772 as represented at lines 790 and 792.

In the event of a negative determination with respect to the query posed at block 784, then as represented at line 794 and block 796 a query is made as to whether there are more mapped documents in the region A. In the event of an affirmative determination, then as represented at line 798 and block 800, the next document in region A is retrieved and the program loops as represented at line 792 to line 772. Where the query posed at block 796 results in a negative determination, then as represented at line 802 and flowchart node 804 the document correlation procedure ends.

Figure 17:
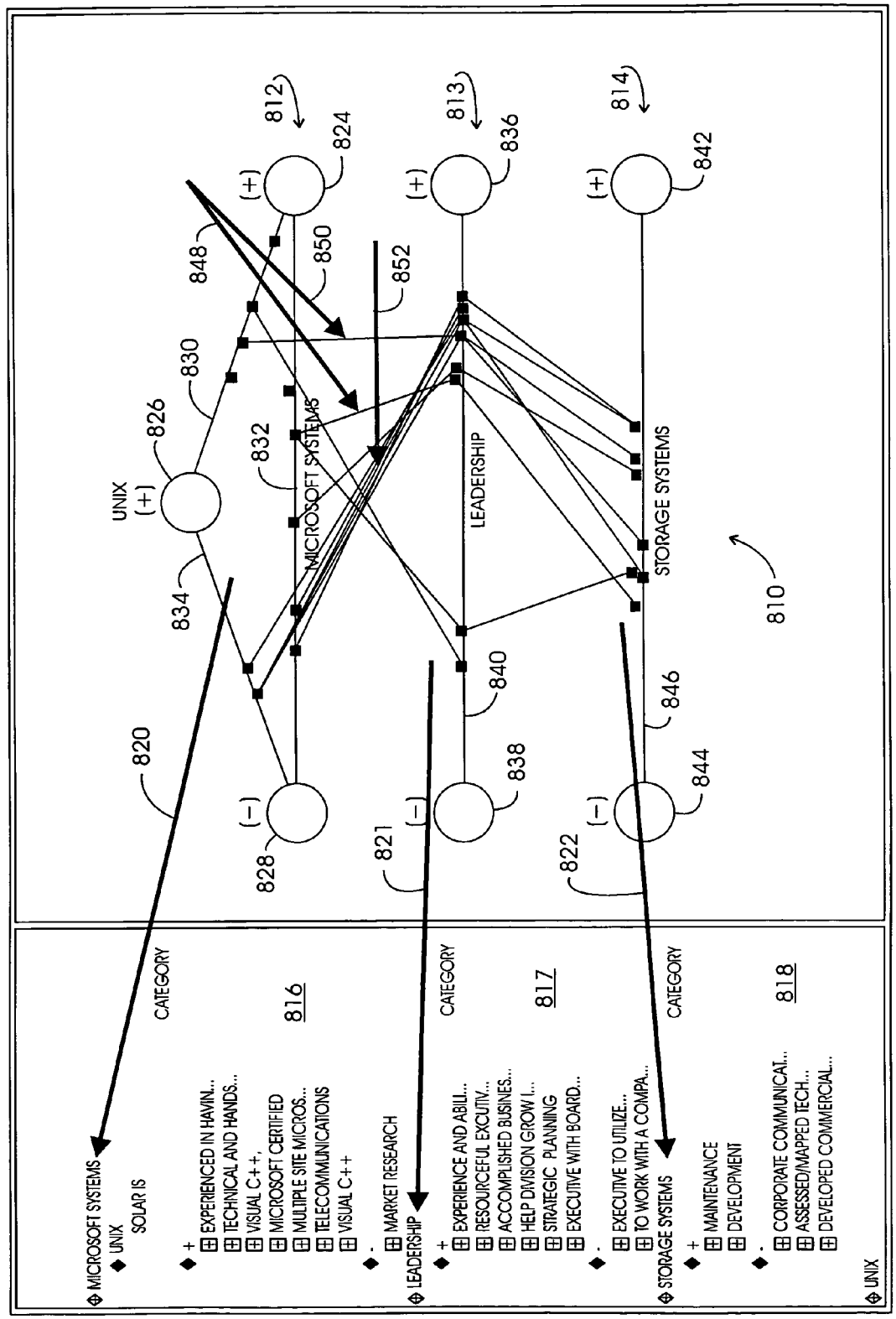
FIG. 17 is a schematic representation of a display illustrating three nets in combination with correlation lines and categories.

Referring to FIG. 17, a representation of a three net correlation display is shown generally at 810. Display 810 illustrates three nets represented generally at 812-814. The attribute employed for the three networks of display 810 for the subject matter of resumes is document identification. Thus, the correlation lines extend between and among symbols representing the same document. To the left of these nets 812-814 are display categories shown respectively at 816-818. An association of nets 812-814 with the weight table items 816-818 are represented respectively by arrow pointers 820-822. These arrow pointers are not part of the display itself. The correlations of display 810 are related to the earlier-described resume based exemplar. In this regard, net 812 is a three node net which is similar to that described in FIG. 4. In this regard, it has a positive node 824 that provides attractors for resumes showing experience with Microsoft systems. Similarly, positive node 826 incorporates attractors with respect to experience with Unix systems. Negative node 828 is associated with non-technical experience, for example, those involved in market research. Nodes 824 and 826 are associated with an interaction represented at line 830. Nodes 824 and 828 are associated by an interaction represented at line 832; and nodes 828 and 826 are associated by an interaction represented at line 834.

Two node net 813 is associated with the subject matter of leadership experience and includes a positive node 836 and a negative node 838 associated by an interaction represented at line 840. The criteria in establishing those nodes are represented at the category 817.

Net 814 also is a two node net comprised of a positive node 842 and a negative node 844 associated with an interaction represented at line 846. Net 814 is concerned with employment candidate experience in the subject of storage systems. Accordingly, nodes 842 and 844 are loaded with criteria represented at category 818.

Among the correlation lines shown, arrow pointers 848 and 850 which are not part of the display are pointing to correlation lines showing resumes of possible interest in that they are strong in two or more nets. Arrow pointer 852 which is also not part of the display is pointing to an array of correlation lines. This array indicates that most of the resume documents represent a trade or tradeoff between the criteria of technical experience and leadership experience.

Since certain changes may be made in the above method without departing from the scope of the invention herein involved, it is intended that all matter contained in the above-description or shown in the accompanying drawings shall be interpreted as illustrative and not in a limiting sense.

The invention claimed is:

1. A method for evaluating the text content of a document database with respect to a document population, comprising the steps of:
   (a) providing a computer system having a user interface with a display;
   (b) gathering documents from said database into said system;
   (c) normalizing said gathered documents;
   (d) fingerprinting said gathered documents;
   (e) determining a text criteria with respect to said document population;
   (f) forming a net comprising at least two nodes associated by at least one interaction and displayable at said display as two or more spaced apart nodes connected by an interaction;
   (g) loading said text criteria into at least one of said nodes;
   (h) for each document of said database, calculating its geometric relative distance from a said node to derive one or more node attractors;
   (i) displaying said net at said display in combination with one or more document symbols each representing a said document located in correspondence with said calculated relative distance;
   (j) visually examining the display of said net and document symbols; and
   (k) determining from said document symbol locations at said display those documents, if any, which are more likely to correspond with said text criteria.

2. The method of claim 1 in which:
   said step (f) forming a net provides for the display of said net as having said nodes defined as circles and said interaction defined as a line extending between said circles.

3. The method of claim 1 in which:
   said step (g) loads said text criteria into a positive designated one of said nodes.

4. The method of claim 1 in which:
   said step (f) forms said net as comprising a positive designated node and a null designated node connected by a said interaction.

5. The method of claim 1 in which:
   said step (e) determines said text criteria as criteria document textual material; and
   said step (g) comprises the steps:
   (g1) normalizing said criteria document textual material; and
   (g2) fingerprinting the normalized criteria document textual material.

6. The method of claim 1 in which:
   said step (e) determines a positive text criteria and a negative text criteria with respect to said document population;
   said step (f) forms a net comprising one or more positive designated nodes, one or more negative designated nodes and one or more interactions;
   said step (g) loads said positive text criteria into said one or more positive designated nodes, and said negative text criteria into said one or more negative designated nodes; and
   said step (h) calculates, for each document of said database its geometric relative distance from both said positive designated node and said negative designated node.

7. The method of claim 1 in which:
   said step (i) displays said one or more document symbols as squares.

8. The method of claim 1 including the steps:
   (l) retrieving the identification of those documents resulting from the determination of step (k); and
   (m) viewing one or more of the documents identified in step (l) and determining the quality of the match thereof with said step (e) text criteria.

9. The method of claim 8 further comprising the steps:
   (n) identifying a new text criteria as a result of a said step (m) determination of an insufficient said quality of said match;
   (o) adding the identified new text criteria to the step (g) text criteria loaded into said positive designated one of said nodes; and
   (p) reiterating said steps (h) through (m).

10. The method of claim 8 further comprising the steps:
    (q) subsequent to said step (m), identifying and viewing at said display a list of features common to those documents the identification of which was retrieved in step (l);
    (r) identifying a new text criteria in correspondence with said step (q) identification and viewing at said display of said features common to those documents the identification of which was retrieved in step (l);
    (s) adding the identified new text criteria to the step (q) text criteria loaded into said positive designated one of said nodes; and
    (t) reiterating said steps (h) through step (m).

11. The method of claim 8 in which:
    said step (l) is carried out by drawing at said display of said net a boundary defining a region of said symbols.

12. The method of claim 1 in which:
said step (k) further comprises the steps:
(k1) determining additional text criteria where said document symbol locations are not likely to correspond with said text criteria determined at step (e); and
(k2) adding said additional text criteria to said text criteria determined at said step (e).

13. A method for evaluating the text content of a document database with respect to a population of documents comprising the steps of:
(a) providing a computer system having a user interface with a display;
(b) forming one or more nets each comprising at least two nodes associated by at least one interaction, one or more said nodes representing an evaluation criteria, said one or more nets being viewable at said display;
(c) treating said documents to have an attribute value and calculating for each document a geometric relative distance with respect to a said node criteria and displaying corresponding document symbols at said display;
(d) delimiting at said display a first region of said document symbols;
(e) delimiting at said display a second region of said document symbols;
(f) selecting a said document attribute value to be correlated and the criteria for establishing an attribute value match;
(g) determining the presence of one or more document attribute value match pairs as correlations between said first and second regions; and
(h) displaying said correlations at said display.

14. The method of claim 13 in which:
said step (d) provides a said first region extending over more than one said net; and includes the step:
(d1) mapping said first region to a first document set by selecting the union or intersection of documents on different nets.

15. The method of claim 13 in which:
said step (e) provides a said second region extending over more than one said net; and including the step:
(e1) mapping said second region to a second document set by selecting the union or intersection of documents on different nets.

16. The method of claim 13 in which:
said step (f) selects said criteria for establishing an attribute value match by defining an attribute value tolerance.

17. The method of claim 16 in which:
said step (g) determines the presence of a document attribute match pair by determining whether the attribute value of a document in said first region is equal to the attribute value of a document in said second region within said attribute value tolerance.

18. The method of claim 13 in which:
said step (d) is carried out by providing a computer generated line or lines visible at said display.

19. The method of claim 13 in which:
said step (e) is carried out by providing a computer generated line or lines visible at said display.

20. The method of claim 13 in which:
said step (h) is carried out by providing visible line at said display connecting two said symbols and representing said correlation.

21. The method of claim 13 in which:
said step (f) selects said document attribute value or document identification; and
said step (g) identifies the same document in each said first and second region as a said correlation.

22. A method for searching the text content of a document database with respect to a population of documents, comprising the steps of:
(a) providing a computer system having a user interface with a display;
(b) identifying the population of documents to be searched;
(c) normalizing the documents of the identified population with the steps comprising
(c1) selecting character sequences that will separate words,
(c2) determining to either retain or eliminate punctuation characters,
(c3) setting regular expressions that will characterize numbers,
(c4) setting case behavior,
(c5) setting an offset and factor for numeric class,
(c6) converting a document of said identified population to a character sequence,
(c7) accessing the words, or punctuation characters, W of said character sequences,
(c8) for each accessed W which is a number, converting such number into a sequence of word numbers, WN, and normalizing said word numbers for fingerprinting,
(c9) marking the position and length of each W or normalized word number WN,
(c10) for each W or normalized WN, completing said normalization by reiterating steps (c8) and (c9);
(d) fingerprinting said normalized documents;
(e) forming one or more nets, each comprising at least two nodes, one or more said nodes representing an evaluation criteria, said one or more nets exhibiting two or more spaced apart nodes connected by one or more interactions;
(f) for each normalized document, calculating its geometric relative distance from a said node;
(g) displaying said one or more nets at said display in combination with one or more document symbols representing a said document located in correspondence with said calculated relative distance; and
(h) determining from said document symbol locations at said display, if any, those documents which are more likely to correspond with said evaluation criteria.

23. The method of claim 22 in which said step (c8) further comprises the steps:
(c8.1) convert any date characterized word number WN to a float or integer,
(c8.2) applying an offset and factor to the word number WN to derive X,
(c8.3) set the range, R,
(c8.4) calculate the quantity $T=(\log_{10}X)/R$,
(c8.5) successively decrementing the value of range, R and calculating the quantity, T until R is equal to zero,
(c8.6) designating S as the position of a significant numeral in X,
(c8.7) assigning each successive quantity T to a corresponding successive position S to derive the first component of normalized word number WN and
(c8.8) subsequent to said step (c8.7), assigning each successive said numeral in X to a corresponding successive position S to derive a second component of said normalized word number, WN.

24. The method of claim 23 in which:
said step (c8.3) further comprises the step: (c8.3.1) setting the precision P of the normalized word number WN, and
said step (c8.8) is carried out until the number of said successive positions S deriving said second component equals the value of said precision, R.

* * * * *